(12) United States Patent
Monomoshi

(10) Patent No.: US 11,892,726 B2
(45) Date of Patent: Feb. 6, 2024

(54) IMAGE DISPLAY METHOD AND IMAGE DISPLAY DEVICE

(71) Applicant: NICHIA CORPORATION, Anan (JP)

(72) Inventor: Masahiko Monomoshi, Itano-gun (JP)

(73) Assignee: Nichia Corporation, Anan (JP)

( * ) Notice: Subject to any disclaimer, the term of this patent is extended or adjusted under 35 U.S.C. 154(b) by 0 days.

(21) Appl. No.: 17/901,609

(22) Filed: Sep. 1, 2022

(65) Prior Publication Data
US 2023/0098989 A1 Mar. 30, 2023

(30) Foreign Application Priority Data

Sep. 28, 2021 (JP) .................. 2021-158196

(51) Int. Cl.
G09G 3/36 (2006.01)
G02F 1/13357 (2006.01)
G09G 3/34 (2006.01)

(52) U.S. Cl.
CPC ..... *G02F 1/133603* (2013.01); *G09G 3/3406* (2013.01); *G09G 3/36* (2013.01); *G09G 2360/16* (2013.01)

(58) Field of Classification Search
CPC .. G09G 3/20; G09G 3/34; G09G 3/36; G09G 5/00; G09G 5/02; G09G 5/10
See application file for complete search history.

(56) References Cited

U.S. PATENT DOCUMENTS

| 2005/0259064 A1 | 11/2005 | Sugino et al. |
| 2006/0158410 A1 | 7/2006 | Fujine |
| 2007/0236446 A1 | 10/2007 | Shin et al. |
| 2009/0184904 A1* | 7/2009 | S ............ G09G 3/3413 345/82 |
| 2011/0025728 A1 | 2/2011 | Baba et al. |
| 2018/0040279 A1* | 2/2018 | Kimura ............ G02F 1/133602 |
| 2018/0240424 A1 | 8/2018 | Aoki et al. |
| 2019/0101778 A1* | 4/2019 | Imai ............ G09G 3/3648 |
| 2019/0340972 A1* | 11/2019 | Hao ............ G09G 3/2088 |

(Continued)

FOREIGN PATENT DOCUMENTS

| JP | 2004-062134 A | 2/2004 |
| JP | 2005-122200 A | 5/2005 |
| JP | 2007-279698 A | 10/2007 |

(Continued)

*Primary Examiner* — Chanh D Nguyen
*Assistant Examiner* — Nguyen H Truong
(74) *Attorney, Agent, or Firm* — Kim & Stewart LLP

(57) ABSTRACT

In an image display method, a backlight is divided into first areas in a first direction. Each of the first areas includes light-emitting regions. A liquid crystal panel is divided into second areas in the first direction. In the method, a first operation to cause light to be emitted from the light-emitting regions at respective intensity in accordance with frame image data is performed sequentially with respect to each of the first areas. Further, a second operation to apply voltages to the pixels at respective levels in accordance with the frame image data is performed sequentially with respect to each of the second areas. A timing at which the first operation with respect to each of the first areas is started is delayed from a timing at which the second operation with respect to a corresponding one of the second areas is started by a predetermined interval.

16 Claims, 12 Drawing Sheets

(56) References Cited

U.S. PATENT DOCUMENTS

2020/0051484 A1    2/2020  Yashiki
2021/0142739 A1*   5/2021  Sun ..................... G09G 3/2014

FOREIGN PATENT DOCUMENTS

| JP | 2008-145966 A | 6/2008 |
| JP | 2010-152174 A | 7/2010 |
| JP | 2011-075800 A | 4/2011 |
| JP | 2011-215345 A | 10/2011 |
| JP | 2013-029563 A | 2/2013 |
| JP | 2013-222081 A | 10/2013 |
| JP | 2015-191809 A | 11/2015 |
| JP | 2016-048298 A | 4/2016 |
| JP | 2018-136495 A | 8/2018 |
| JP | 2020-027273 A | 2/2020 |

* cited by examiner

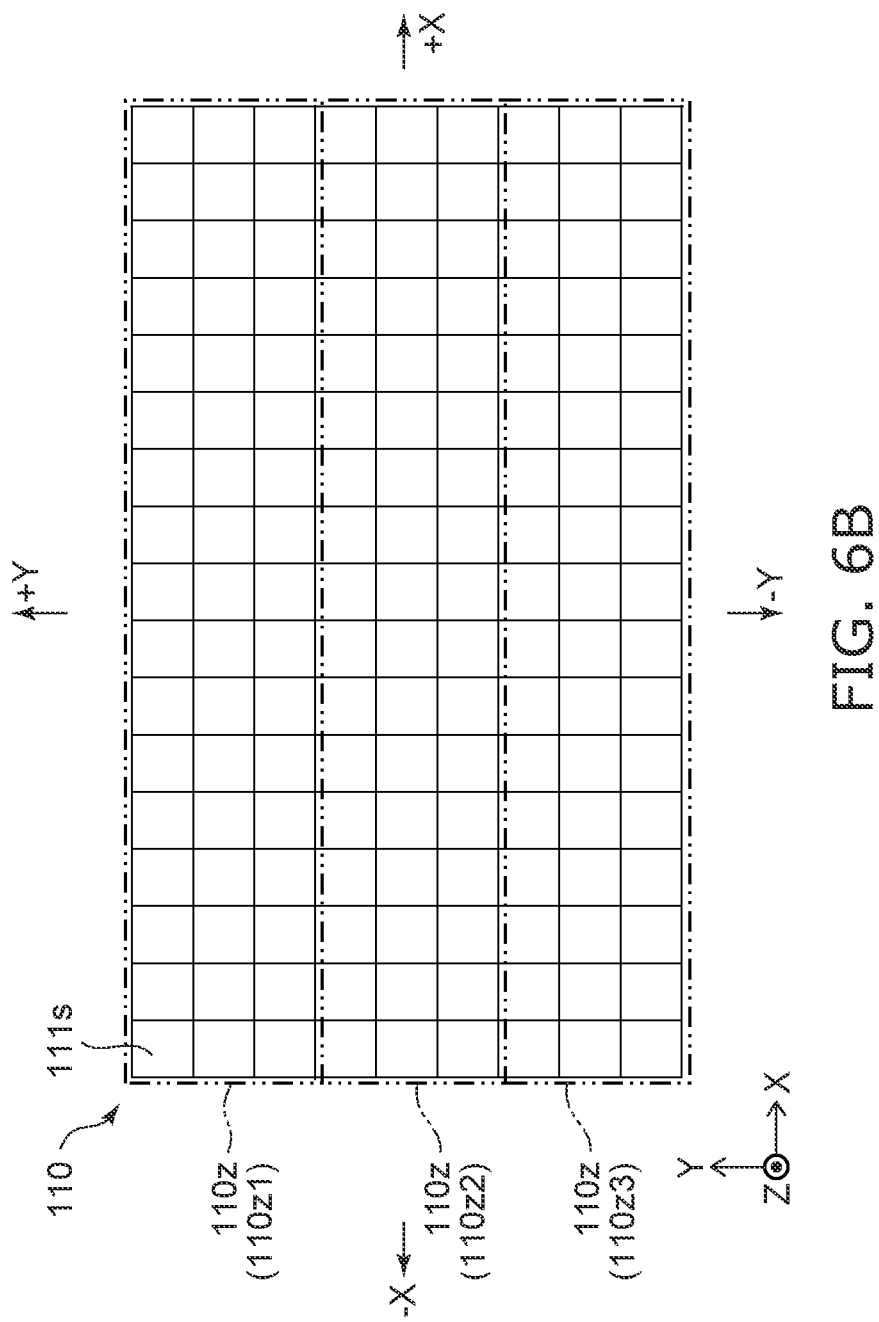

IMAGE DISPLAY METHOD AND IMAGE DISPLAY DEVICE

CROSS-REFERENCE TO RELATED APPLICATIONS

This application is based upon and claims the benefit of priority from the prior Japanese Patent Application No. 2021-158196, filed on Sep. 28, 2021, the entire contents of which are incorporated herein by reference.

FIELD

Embodiments relate to an image display method and an image display device.

BACKGROUND

A conventionally-known image display device includes a backlight and a liquid crystal panel. The backlight includes multiple light-emitting regions arranged in a matrix configuration and in which light sources are located in the light-emitting regions. The liquid crystal panel is located above the backlight and includes multiple pixels. By using such an image display device, luminances of the light-emitting regions can be individually set according to an image to be displayed in the liquid crystal panel, and gradations of the pixels of the liquid crystal panel can be set according to the luminances of the light-emitting regions. The contrast of the image to be displayed in the liquid crystal panel can be improved thereby. Such technology is called "local dimming".

SUMMARY

According to one aspect of the present invention, an image display method using an image display device is provided. The image display device includes a back light and a liquid crystal panel. The backlight has a plurality of light-emitting regions arranged in a matrix configuration in a first direction and a second direction. The light-emitting regions is divided into a plurality of first areas in the first direction. The liquid crystal panel is on the backlight. The liquid crystal panel has a plurality of pixels arranged in a matrix configuration in the first and second directions. The pixels are divided into a plurality of second areas in the first direction. In the method, a first operation to cause light to be emitted from the light-emitting regions at respective intensity in accordance with frame image data is performed sequentially with respect to each of the first areas. Further, a second operation to apply voltages to the pixels at respective levels in accordance with the frame image data is performed sequentially with respect to each of the second areas. A timing at which the first operation with respect to each of the first areas is started is delayed from a timing at which the second operation with respect to a corresponding one of the second areas is started by a predetermined interval.

According to another aspect of the present invention, an image display device is provided. The image display device includes a back light, a liquid crystal panel, and a controller. The backlight includes a plurality of light-emitting regions arranged in a matrix configuration in a first direction and a second direction. The light-emitting regions are divided into a plurality of first areas in the first direction. The liquid crystal panel is on the backlight. The liquid crystal panel includes a plurality of pixels arranged in a matrix configuration in the first and second directions. The pixels are divided into a plurality of second areas in the first direction. The controller is configured to perform a first operation to cause light to be emitted from the light-emitting regions at respective intensity corresponding to frame image data, sequentially with respect to each of the first areas, and a second operation to apply voltages to the pixels at respective levels corresponding to the frame image data, sequentially with respect to each of the second areas. A timing at which the controller starts the first operation with respect to each of the first areas is delayed from a timing at which the controller starts the second operation with respect to a corresponding one of the second areas by a predetermined interval.

BRIEF DESCRIPTION OF THE DRAWINGS

FIG. 6B schematically illustrates areas of the backlight of which outputs are simultaneously controlled according to the embodiment.

DETAILED DESCRIPTION

Figure 1:
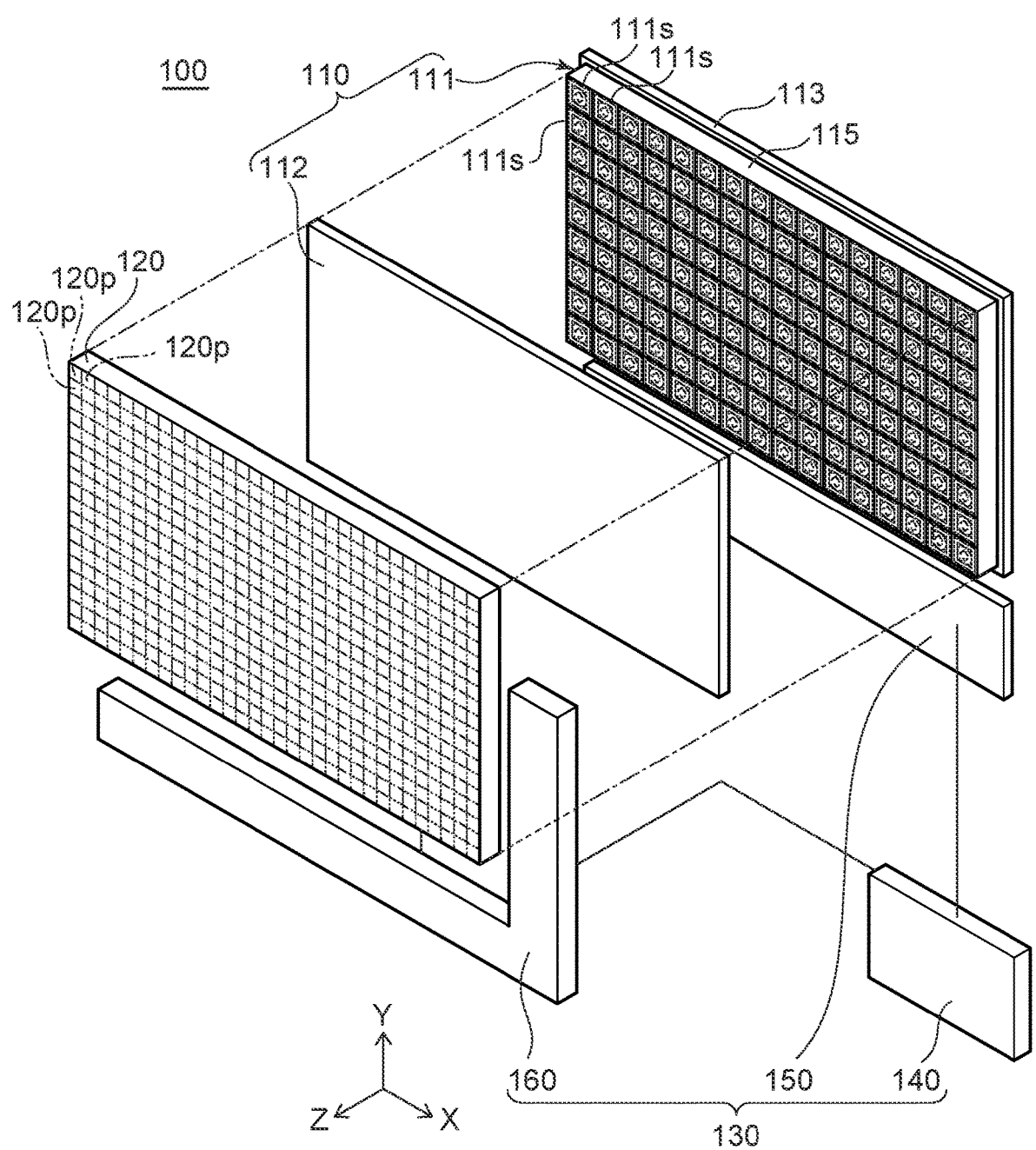
FIG. 1 illustrates an exploded perspective view of an image display device according to an embodiment.

Embodiments and modifications will now be described with reference to the drawings. The drawings are schematic or conceptual; and the relationships between thickness and width of portions, proportional coefficients of sizes among portions, etc., are not necessarily the same as the actual values thereof. Furthermore, dimensions and proportional coefficients may be illustrated differently among drawings, even for identical portions. In the specification of the application and the drawings, components similar to those described in regard to an antecedent drawing are marked with the same reference numerals; a detailed description may be omitted as appropriate; and an end view that shows only a cross section may be used as a cross-sectional view.

For easier understanding of the following description, arrangements and configurations of the portions are described using an XYZ orthogonal coordinate system. X-axis, Y-axis, and Z-axis are orthogonal to each other. The direction in which the X-axis extends is referred to as an "X-direction"; the direction in which the Y-axis extends is referred to as a "Y-direction"; and the direction in which the Z-axis extends is referred to as a "Z-direction". Although the Z-direction that is from the backlight toward the liquid crystal panel is referred to as "up" and the opposite direction is referred to as "down", these directions are independent of the direction of gravity. For easier understanding of the description, one direction in which the X-axis extends in the drawings is called the "+X direction"; and the opposite direction is called the "−X direction". Similarly, one direction in which the Y-axis extends is called the "+Y direction"; and the opposite direction is called the "−Y direction".

FIG. 1 illustrates an exploded perspective view of an image display device according to an embodiment.

The image display device 100 according to the embodiment is, for example, a liquid crystal module (LCM) used in a display of an external device (not illustrated) such as a television, a personal computer, a game machine, etc. The image display device 100 includes a backlight 110, a liquid crystal panel 120, and a controller 130. The controller 130 includes a timing controller 140, a driver 150 for the backlight 110, and a driver 160 for the liquid crystal panel 120. Components of the image display device 100 will now be described. For easier understanding of the description, electrical connections between the components are shown by connecting the components to each other with solid lines in FIG. 1.

Backlight

The backlight 110 is drivable by local dimming. The backlight 110 includes a planar light source 111, and an optical member 112 located on the planar light source 111.

The optical member 112 is, for example, a sheet or a plate that has a light-modulating function such as light diffusion, etc. According to the embodiment, the number of the optical members 112 included in the backlight 110 is one. Alternatively, the number of optical members included in the backlight may be two or more.

Figure 2:
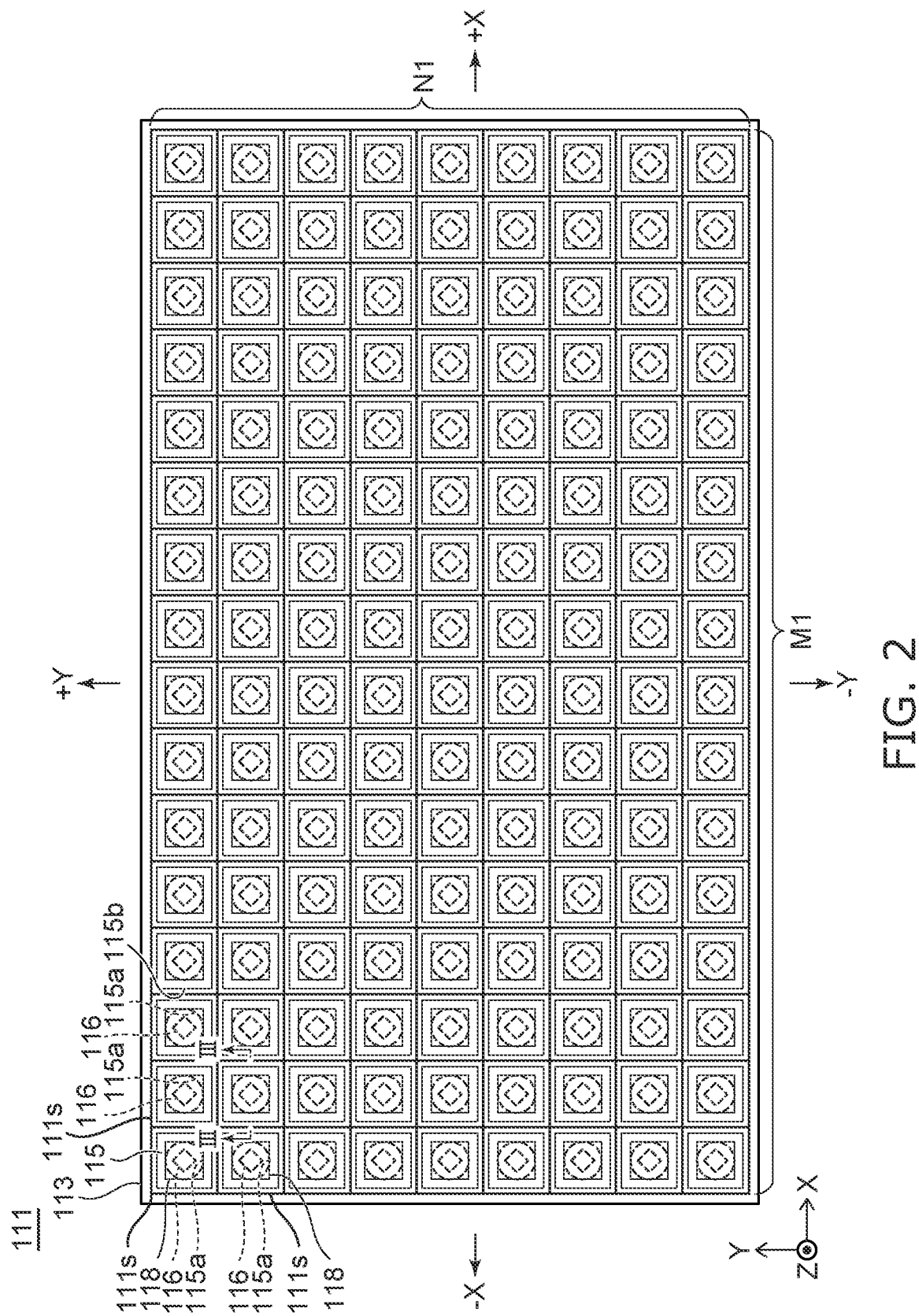
FIG. 2 illustrates a top view of a planar light source of a backlight of the image display device according to the embodiment.

FIG. 2 illustrates a top view of the planar light source of the backlight of the image display device according to the embodiment.

Figure 3:
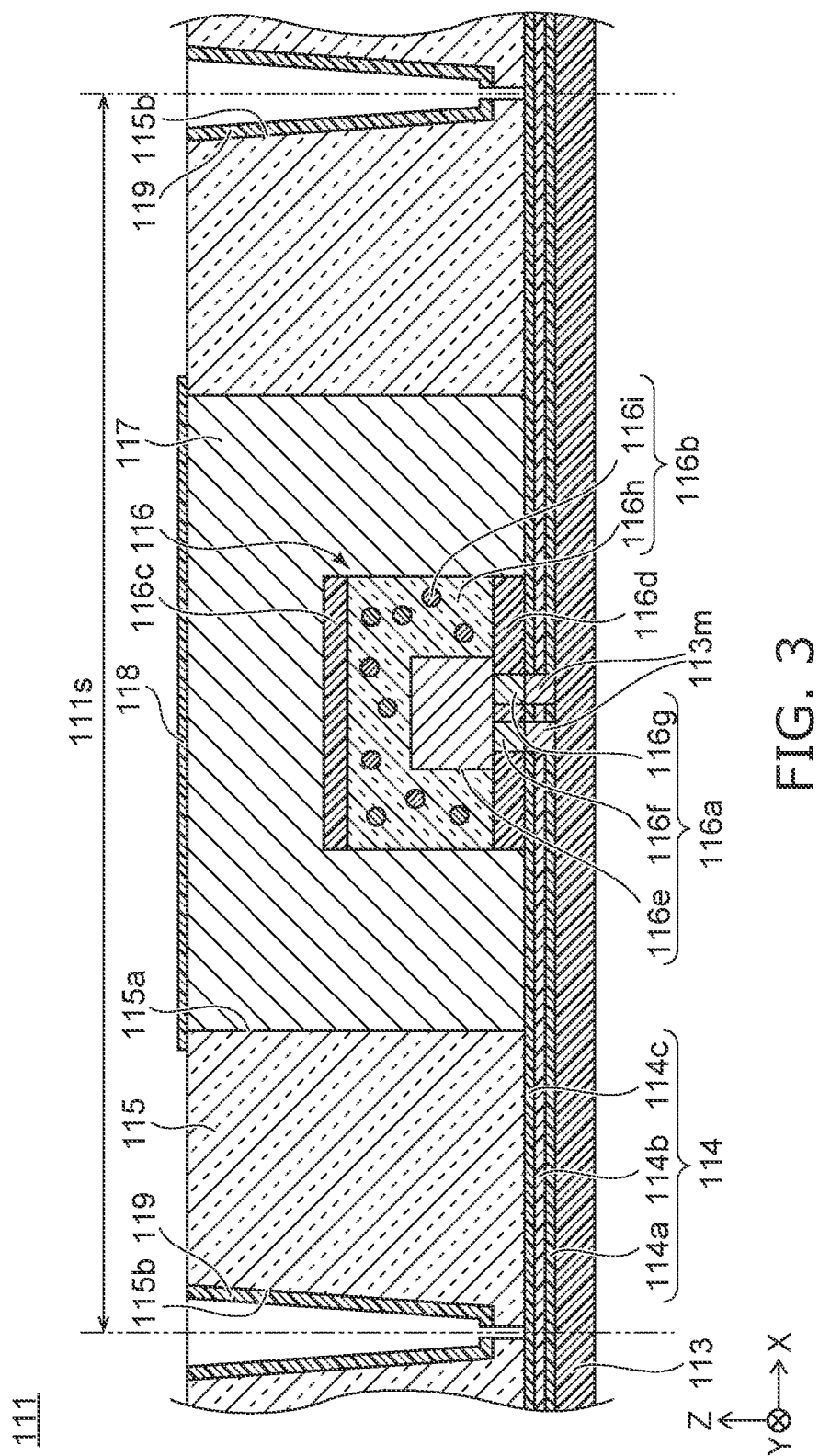
FIG. 3 illustrates a cross-sectional view of the planar light source along line in FIG. 2.

FIG. 3 illustrates a cross-sectional view of the planar light source along line in FIG. 2.

According to the embodiment, as shown in FIGS. 2 and 3, the planar light source 111 includes a substrate 113, a light-reflective sheet 114, a light guide member 115, multiple light sources 116, a light-transmitting member 117, a first light-modulating member 118, and a light-reflecting member 119.

The substrate 113 is a wiring substrate that includes an insulating member and multiple wirings located on the insulating member. The shape of the substrate 113 when viewed in top-view is substantially rectangular as shown in FIG. 2. However, the shape of the substrate is not limited to such a shape. The upper surface and the lower surface of the substrate 113 are flat surfaces and are substantially parallel to the X-direction and the Y-direction (i.e., the XY plane).

As shown in FIG. 3, the light-reflective sheet 114 is located on the substrate 113. The light-reflective sheet 114 includes, for example, a first adhesive layer 114a, a light-reflecting layer 114b located on the first adhesive layer 114a, and a second adhesive layer 114c located on the light-reflecting layer 114b. The light-reflective sheet 114 is adhered to the substrate 113 with the first adhesive layer 114a. For example, a resin that includes many bubbles can be used as the light-reflecting layer 114b. The first adhesive layer 114a and the second adhesive layer 114c can include, for example, a light-diffusing agent. In such a case, it is favorable for the concentration of the light-diffusing agent included in the second adhesive layer 114c to be less than the concentration of the light-diffusing agent included in the first adhesive layer 114a to reduce uneven luminance of light-emitting regions 111s described below. As appropriate, for example, the light-diffusing agent can be selected from light-diffusing agents included in a second light-modulating member 116c and a third light-modulating member 116d described below.

The light guide member 115 is located on the light-reflective sheet 114. The light guide member 115 is adhered to the light-reflective sheet 114 with the second adhesive layer 114c. The light guide member 115 is plate-shaped. However, the shape of the light guide member is not limited to such a shape. It is favorable for the thickness of the light guide member 115 to be not less than 200 μm and not more than 800 μm. The light guide member 115 may be a single layer or may include a stacked body of multiple layers.

For example, a thermoplastic resin such as acrylic, polycarbonate, cyclic polyolefin, polyethylene terephthalate, polyester, or the like, a thermosetting resin such as epoxy, silicone, or the like, glass, etc., are examples of materials included in the light guide member 115.

Multiple light source placement portions 115a are located in the light guide member 115. As shown in FIG. 2, the multiple light source placement portions 115a are arranged in a matrix configuration when viewed in top-view. As shown in FIG. 3, each light source placement portion 115a is a through-hole that extends through the light guide member 115 in the Z-direction. Alternatively, the light source placement portion may be a recess located at the lower surface of the light guide member.

The light sources 116 are located in the light source placement portions 115a, respectively. Accordingly, as shown in FIG. 2, the multiple light sources 116 also are arranged in a matrix configuration. Alternatively, the light sources 116 may be embedded in the light guide member 115 without providing light source placement portions in the light guide member 115. Also, it is not always necessary for the light guide member 115 to be included in the planar light source 111. For example, the planar light source 111 may include no light guide member, and the multiple light sources 116 may be simply arranged in a matrix configuration on the substrate 113.

As shown in FIG. 3, each light source 116 is a light-emitting device in which a wavelength conversion member 116b is coupled to a light-emitting element 116a. Each light source 116 further includes the second light-modulating member 116c and the third light-modulating member 116d. Alternatively, each light source may be a solitary light-emitting element instead of a light-emitting device.

The light-emitting element 116a is, for example, an LED (Light-Emitting Diode). The light-emitting element 116a includes a semiconductor stacked body 116e and a pair of electrodes 116f and 116g that electrically connects the semiconductor stacked body 116e and the wiring of the substrate 113. Through-holes are located in portions of the light-reflective sheet 114 positioned directly under the electrodes 116f and 116g. Conductive members 113m that electrically connect the wiring of the substrate 113 and the electrodes 116f and 116g are located in the through-holes.

The wavelength conversion member 116b includes a light-transmitting member 116h that covers the upper surface and the side surface of the semiconductor stacked body 116e, and a wavelength conversion substance 116i that is located in the light-transmitting member 116h and converts the wavelength of the light emitted by the semiconductor stacked body 116e into a different wavelength. The wavelength conversion substance 116i is, for example, a fluorescer.

According to the embodiment, the light-emitting element 116a emits blue light. On the other hand, the wavelength conversion member 116b includes a fluorescer that generates red light and a fluorescer that generates green light. Hereinbelow, a fluorescer that generates red light is called a "red fluorescer"; and a fluorescer that generates green light is called a "green fluorescer". For example, a CASN-based fluorescer (e.g., $CaAlSiN_3$:Eu), a KSF-based fluorescer (e.g., $K_2SiF_6$:Mn), a KSAF-based fluorescer (e.g., $K_2[Si_pAl_qMn_rF_s]$ ($0.9 \leq p+q+r \leq 1.1$, $0 < q \leq 0.1$, $0 < r \leq 0.2$, and $5.9 \leq s \leq 6.1$)), or a quantum dot fluorescer (e.g., $Ag_pCu_{1-p}In_qGa_{1-q}S_2$ ($0 < p \leq 1$ and $0 < q \leq 1$)) are examples of the red fluorescer. For example, a fluorescer that has a perovskite structure (e.g., $CsPb(F, Cl, Br, I)_3$), a β-sialon-based fluorescer (e.g., $(Si, Al)_3(O, N)_4$:Eu), a LAG-based fluorescer (e.g., $Lu_3(Al, Ga)_5O_{12}$:Ce), or a quantum dot fluorescer (e.g., $AgIn_pGa_{1-p}S_2$ ($0 < p \leq 1$)) are examples of the green fluorescer. The backlight 110 can emit white light that is composed of the blue light emitted by the light-emitting element 116a and the red and green light generated by the wavelength conversion member 116b.

In an alternative embodiment, the wavelength conversion member 116b may be a light-transmitting member that does not include a fluorescer. In such a case, and when the light source is a solitary light-emitting element as described above, for example, similar white light can be obtained by providing a fluorescer sheet including a red fluorescer and a green fluorescer on the planar light source or by providing a fluorescer sheet including a red fluorescer and a fluorescer sheet including a green fluorescer on the planar light source.

The second light-modulating member 116c covers the upper surface of the wavelength conversion member 116b. The second light-modulating member 116c can control the amount and/or emission direction of the light emitted from the upper surface of the wavelength conversion member 116b.

The third light-modulating member 116d covers the lower surface of the light-emitting element 116a and the lower surface of the wavelength conversion member 116b so that the lower surfaces of the electrodes 116f and 116g are exposed. The third light-modulating member 116d can reflect the light toward the lower surface of the wavelength conversion member 116b to control the light to be emitted from the upper surface and the side surface of the wavelength conversion member 116b.

The second light-modulating member 116c and the third light-modulating member 116d each can include a light-transmitting resin, and a light-diffusing agent included in the light-transmitting resin. For example, a silicone resin, an epoxy resin, or an acrylic resin are examples of the light-transmitting resin. For example, particles of titania, silica, alumina, zinc oxide, magnesium oxide, zirconia, yttria, calcium fluoride, magnesium fluoride, niobium pentoxide, barium titanate, tantalum pentoxide, barium sulfate, glass, etc., are examples of the light-diffusing agent. The second light-modulating member 116c may also include a metal member such as, for example, aluminum, silver, etc., so that the luminance directly above the light source 116 does not become too high.

The light-transmitting member 117 is located in the light source placement portion 115a. The light-transmitting member 117 covers the light source 116.

The first light-modulating member 118 is located on the light-transmitting member 117. The first light-modulating member 118 can reflect a portion of the light incident from the light-transmitting member 117 and can transmit another portion of the light so that the luminance directly above the light source 116 does not become too high. It is favorable for the first light-modulating member 118 to cover the interface between the light-transmitting member 117 and the light guide member 115 when viewed in top-view so that locally high luminance due to scattering of the light from the light source 116 at the interface between the light-transmitting member 117 and the light guide member 115 can be suppressed. The first light-modulating member 118 can include a member similar to the second or third light-modulating member 116c or 116d.

As shown in FIGS. 2 and 3, a partitioning trench 115b is provided in the light guide member 115 to surround the light source placement portions 115a when viewed in top-view. The partitioning trench 115b has a lattice shape and extends in the X-direction and the Y-direction. The partitioning trench 115b extends through the light guide member 115 in the Z-direction. However, the partitioning trench 115b may be a recess provided in the upper or lower surface of the light guide member 115. Also, the partitioning trench 115b may not be provided in the light guide member 115.

The light-reflecting member 119 is located in the partitioning trench 115b. The light-reflecting member 119 can include, for example, a member similar to the second or third light-modulating member 116c or 116d. The light-reflecting member 119 covers a portion of the side surface of the partitioning trench 115b in a layer shape. The light-reflecting member 119 may extend to cover the light-reflective sheet 114 exposed in the partitioning trench 115b, and particularly the upper surface of the second adhesive layer 114c so that the light from the light source 116 can be partitioned for each of the light-emitting regions 111s described below. Alternatively, the light-reflecting member 119 may fill the entire interior of the partitioning trench 115b. Also, the light-reflecting member 119 may not be located in the partitioning trench 115b.

The outputs of the multiple light sources 116 are individually controllable by the backlight driver 150. Here, "controllable output" means that switching between a lit state and an unlit state is possible, and the luminance in the lit state is adjustable. Hereinbelow, the regions when viewed in the top-view of the planar light source 111 when subdivided into regions that include the light sources 116 of which outputs are individually controlled are called the "light-emitting regions 111s". The light-emitting region 111s corresponds to the minimum region of the planar light source 111 of which luminance is controlled by local dimming.

According to the embodiment, the light-emitting regions 111s correspond to regions when the planar light source 111 is partitioned into a lattice shape similarly to the partitioning trench 115b. Therefore, each light-emitting region 111s is rectangular as shown in FIG. 2. One light source 116 is located in one light-emitting region 111s. Alternatively, multiple light source groups may be arranged in a matrix configuration in the planar light source; and the output of each light source group may be controlled. In such a case, one light source group, i.e., a plurality of light sources, is located in one light-emitting region.

The multiple light-emitting regions 111s are arranged in a matrix configuration when viewed in top-view. Hereinbelow, in the structure of a matrix configuration such as that of the multiple light-emitting regions 111s, an element group of the matrix of the light-emitting regions 111s and the like arranged in the X-direction is called a "row"; and an element group of the matrix of the light-emitting regions 111s and the like arranged in the Y-direction is called a "column". The row that is positioned furthest toward the +Y side (the left side of FIG. 2) is referred to as the "first row"; and the row that is positioned furthest toward the −Y side (the right side of FIG. 2) is referred to as the "final row". Similarly, the column that is positioned furthest toward the −X side (the lower side of FIG. 2) is referred to as the "first column"; and the column that is positioned furthest toward the +X side (the upper side of FIG. 2) is referred to as the "final column". This is also similar for data that has a matrix configuration in an input image 910 described below, etc. The multiple light-emitting regions 111s are arranged in N1 rows and M1 columns. Here, N1 and M1 each are any integer; and an example is shown in FIG. 2 in which N1 is 9 and M1 is 16.

Liquid Crystal Panel

Figure 4:
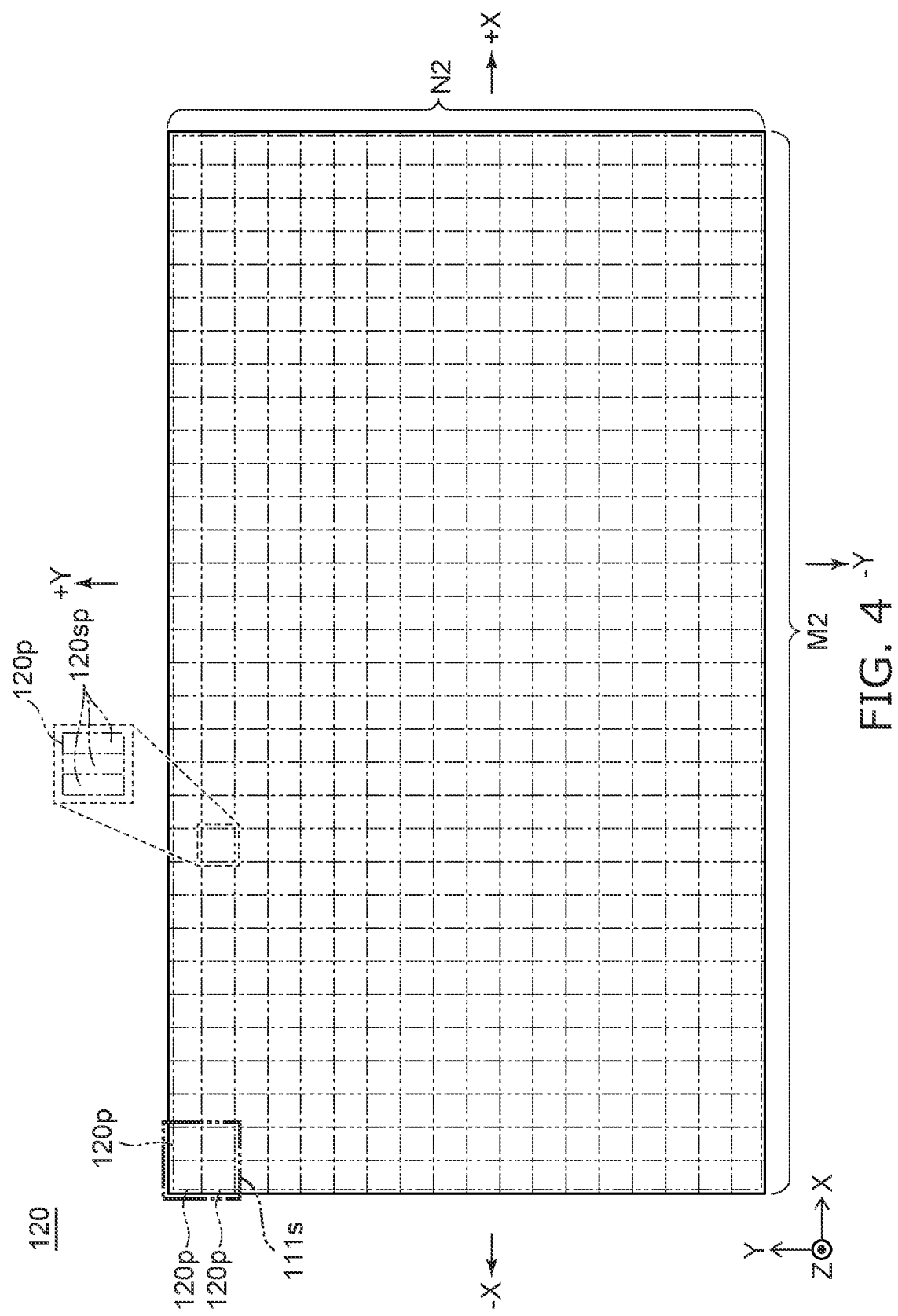
FIG. 4 illustrates a top view of a liquid crystal panel of the image display device according to the embodiment.

FIG. 4 illustrates a top view of the liquid crystal panel 120 of the image display device 100 according to the embodiment.

The liquid crystal panel 120 is located on the backlight 110. The liquid crystal panel 120 is substantially rectangular when viewed in top-view. However, the shape of the liquid crystal panel is not limited to such a shape. The liquid crystal panel 120 includes multiple pixels 120p arranged in a matrix configuration. In FIG. 4, one region that is surrounded with a fine double dot-dash line corresponds to one pixel 120p.

According to the embodiment, the liquid crystal panel 120 can display a color image. To achieve that objective, one pixel 120p includes three subpixels 120sp: a subpixel that can transmit blue light, a subpixel that can transmit green light, and a subpixel that can transmit red light when white light emitted from the backlight 110 is incident. The light transmittances of the subpixels 120sp are individually controllable by the liquid crystal panel driver 160. The gradations of the subpixels 120sp are individually controlled thereby.

The multiple pixels 120p are arranged in N2 rows and M2 columns. Here, N2 and M2 each are any integer such that N2>N1 and M2>M1. The multiple pixels 120p are located in the light-emitting regions 111s when viewed in top-view. Although an example is shown in FIG. 4 in which four pixels 120p are located in each light-emitting region 111s when viewed in top-view, the number of pixels of the liquid crystal panel located in each light-emitting region may be more or less than four.

Figure 5:
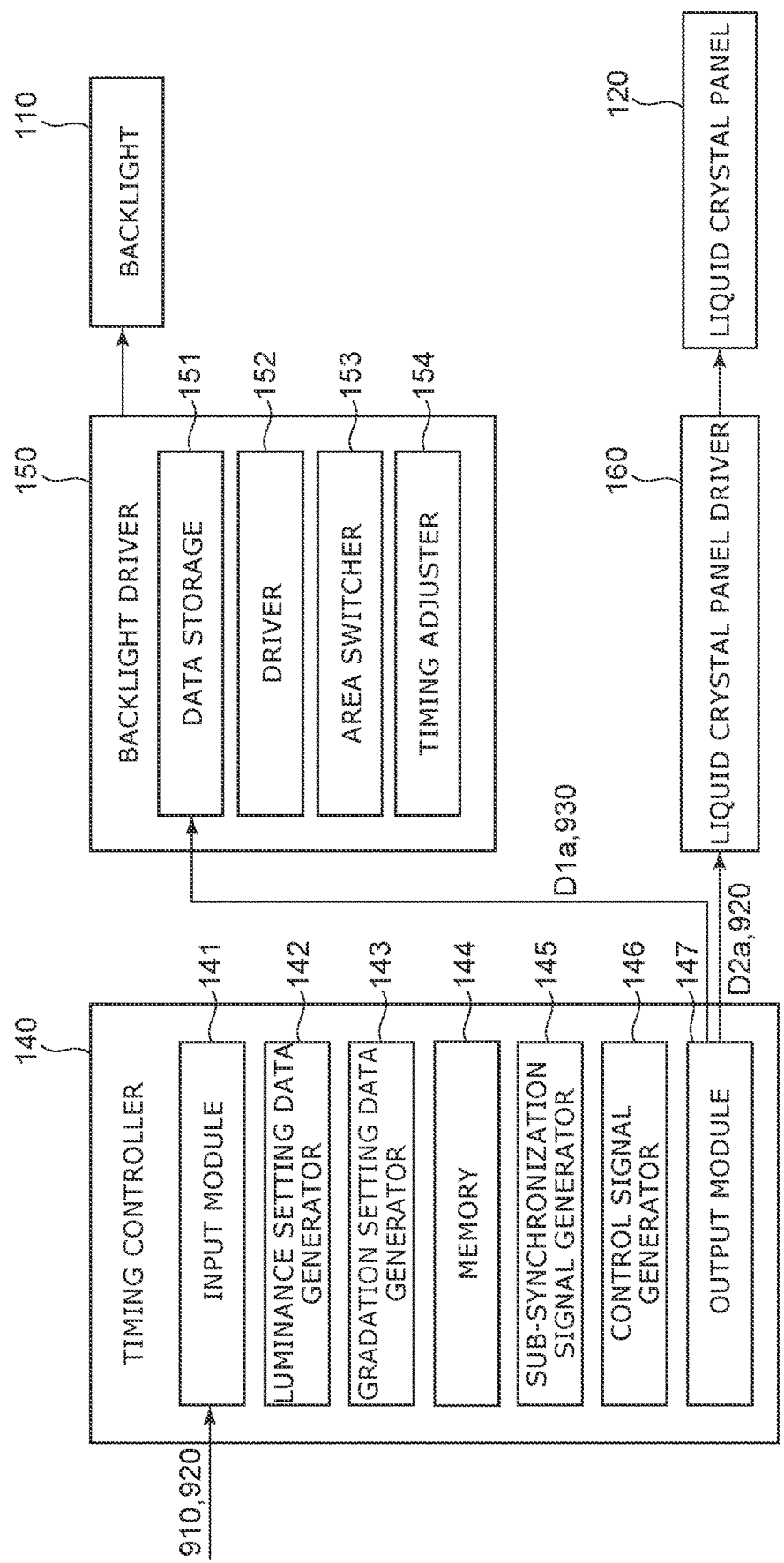
FIG. 5 is a block diagram showing components of the image display device according to the embodiment.

FIG. 5 is a block diagram showing components of the image display device according to the embodiment.

Figure 6A:
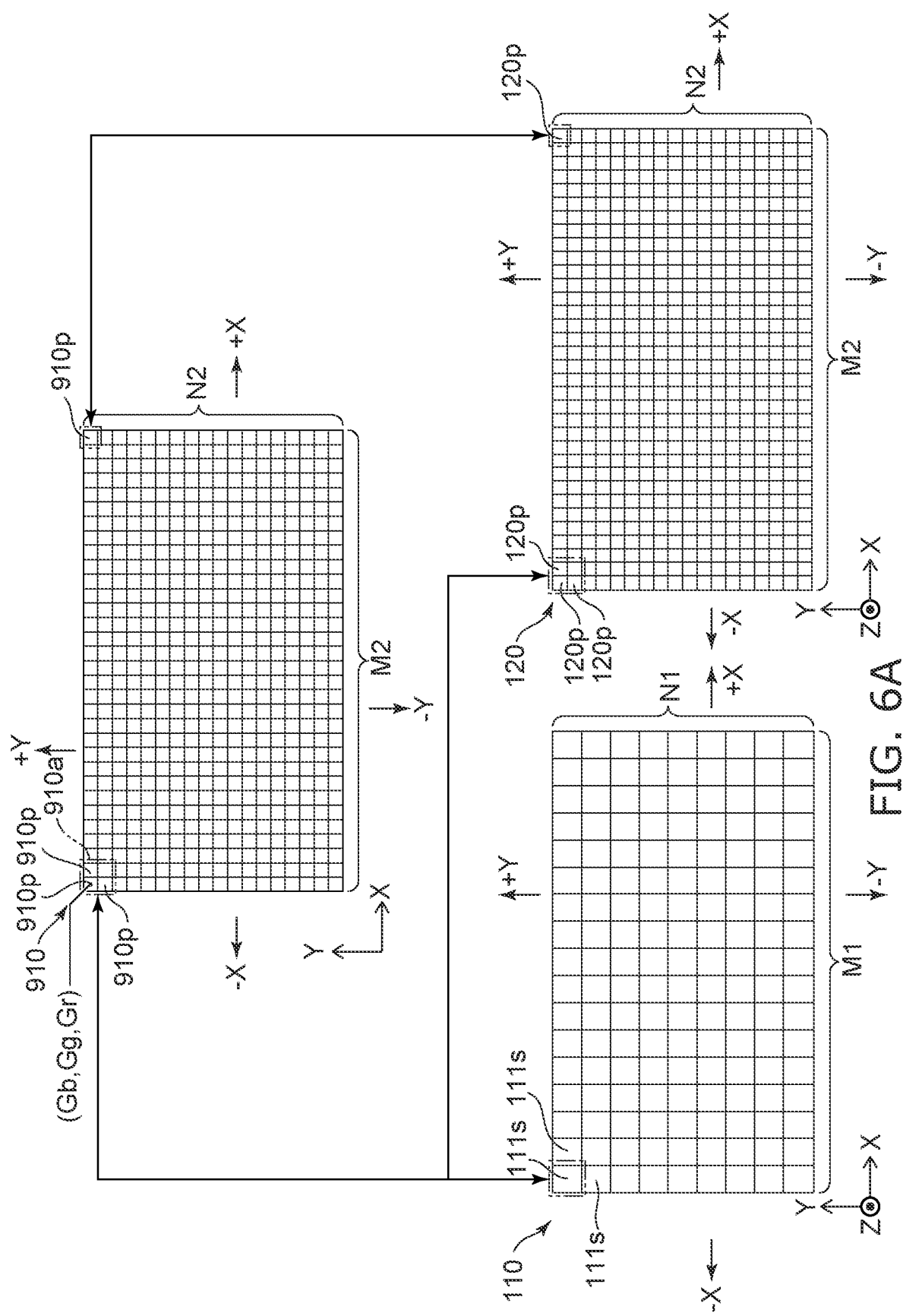
FIG. 6A schematically illustrates a relationship among pixels of an input image, a light-emitting regions of the backlight, and pixels of the liquid crystal panel according to the embodiment.

FIG. 6A schematically illustrate the relationship among the pixels of the input image, the light-emitting regions of the backlight, and the pixels of the liquid crystal panel according to the embodiment.

FIG. 6B schematically illustrates areas of the backlight of which outputs are simultaneously controlled according to the embodiment.

Figure 6C:
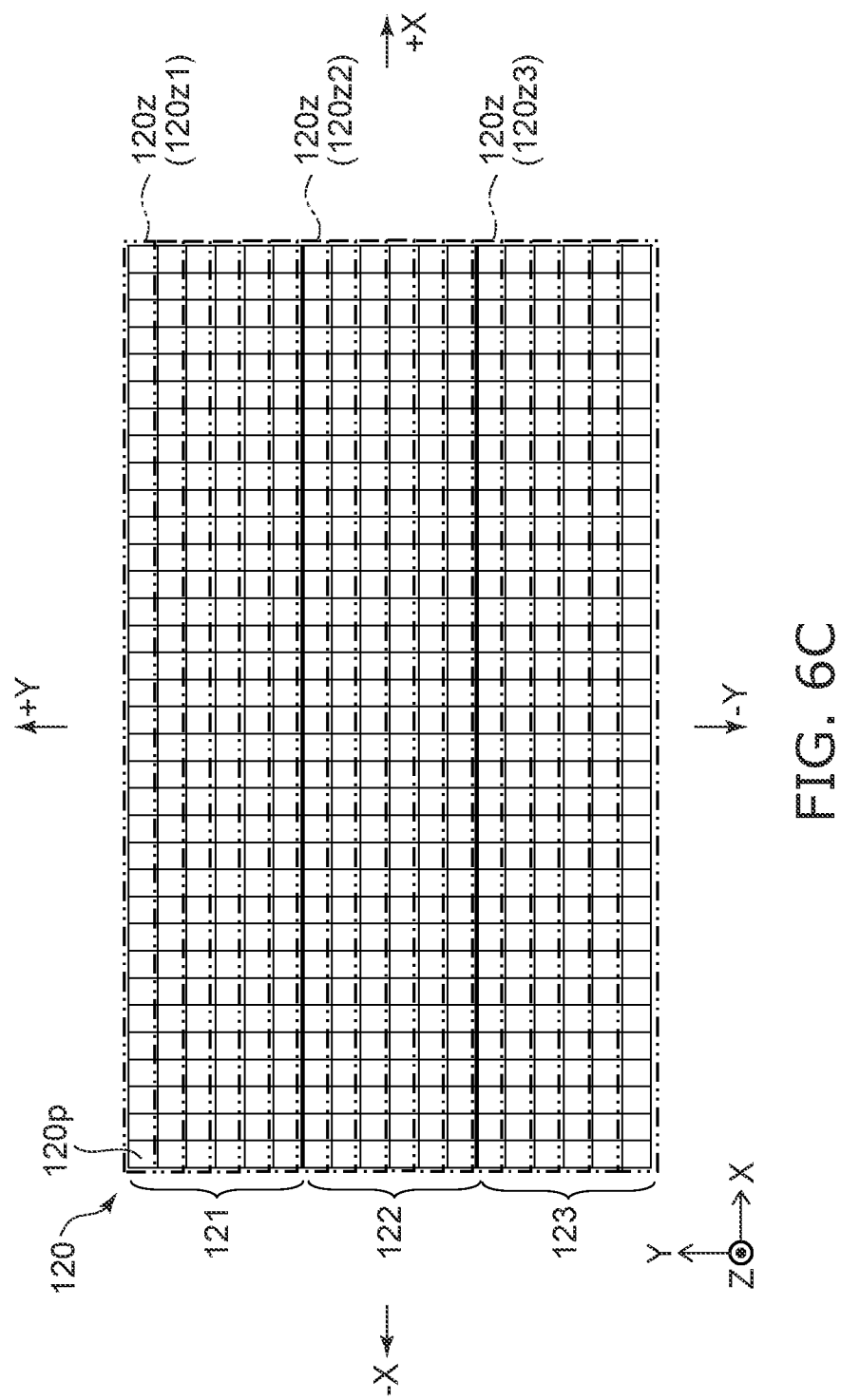
FIG. 6C schematically illustrates areas of the liquid crystal panel of which gradations are simultaneously controlled according to the embodiment.

FIG. 6C schematically illustrate areas of the liquid crystal panel of which gradations are simultaneously controlled according to the embodiment.

Figure 7:
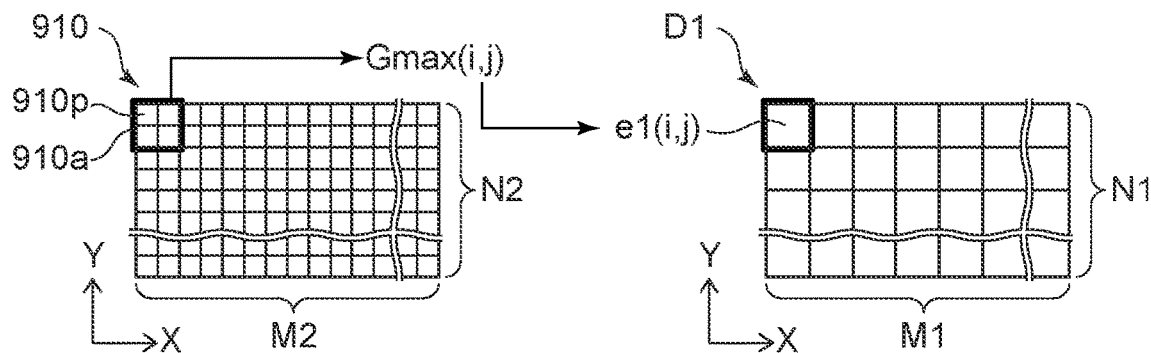
FIG. 7 is a diagram to explain a method for generating luminance setting data.

FIG. 7 is a diagram to explain a method for generating luminance setting data.

Figure 8:
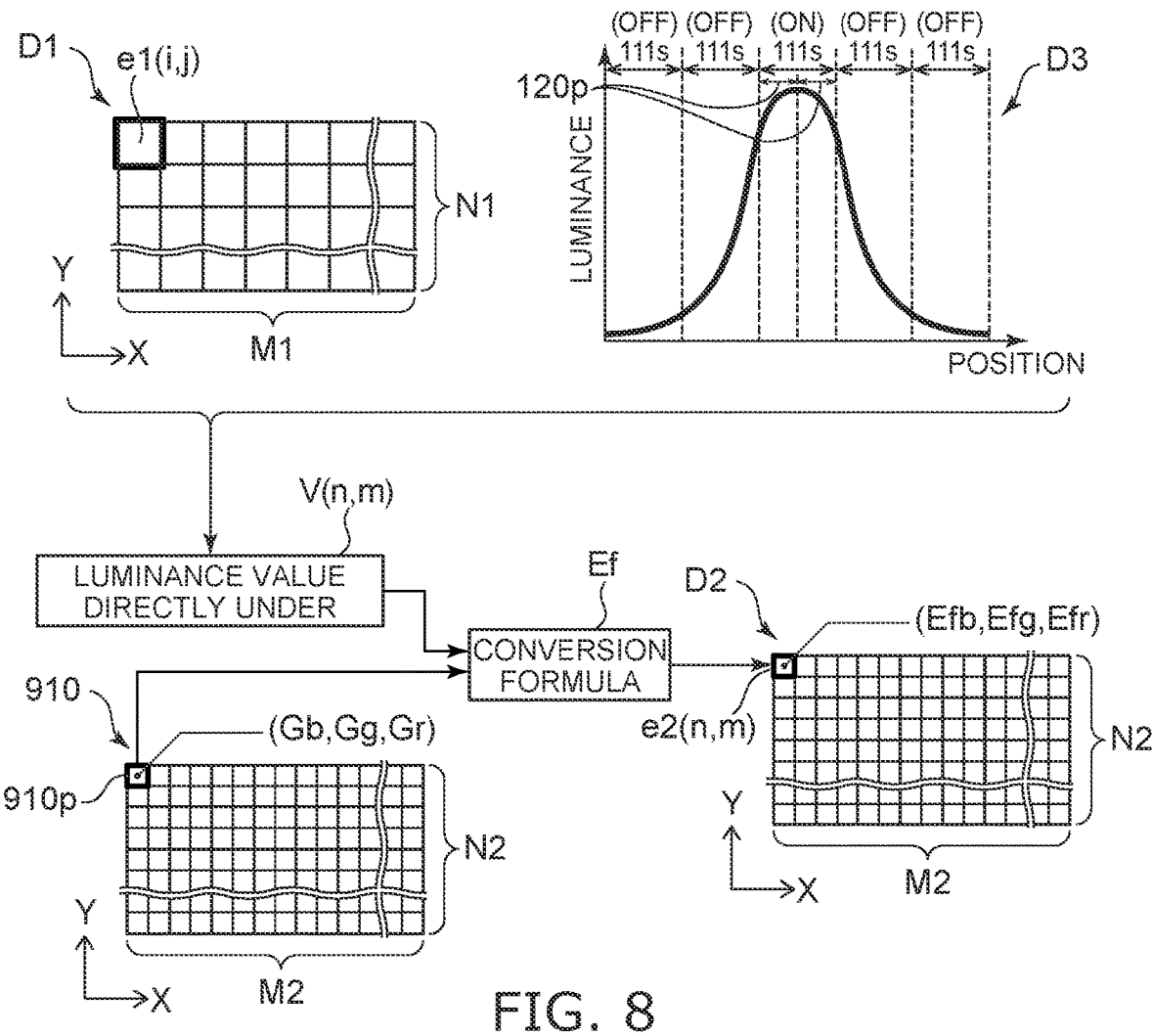
FIG. 8 is a diagram to explain a method for generating gradation setting data.

FIG. 8 is a diagram to explain a method for generating gradation setting data.

Figure 9A:
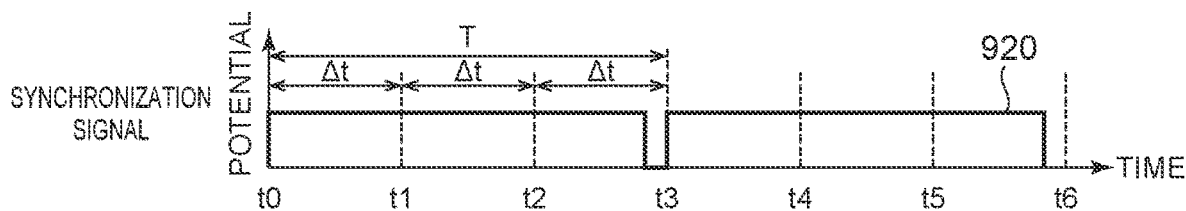
FIG. 9A is a timing chart schematically illustrating a temporal change of a synchronization signal according to the embodiment.

FIG. 9A is a timing chart schematically illustrating the temporal change of a synchronization signal according to the embodiment.

Figure 9B:
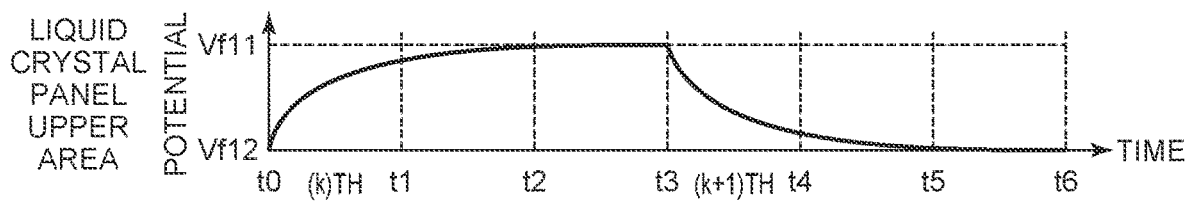
FIG. 9B is a timing chart schematically illustrating a temporal change of potential of a pixel belonging to an upper area of the liquid crystal panel according to the embodiment.

FIG. 9B is a timing chart schematically illustrating the temporal change of the potential of a pixel belonging to the upper area of the liquid crystal panel according to the embodiment.

Figure 9C:
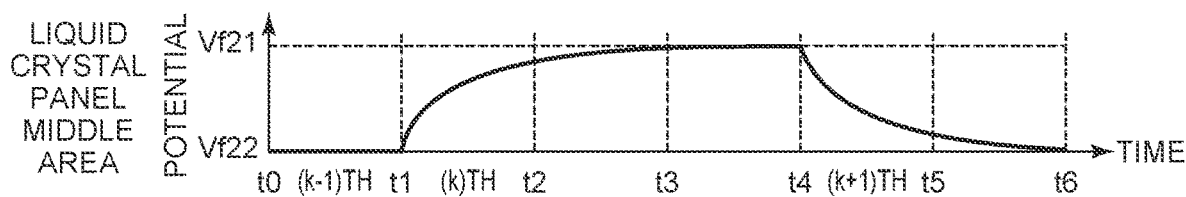
FIG. 9C is a timing chart schematically illustrating a temporal change of potential of a pixel belonging to a middle area of the liquid crystal panel according to the embodiment.

FIG. 9C is a timing chart schematic ally illustrating the temporal change of the potential of a pixel belonging to the middle area of the liquid crystal panel according to the embodiment.

Figure 9D:
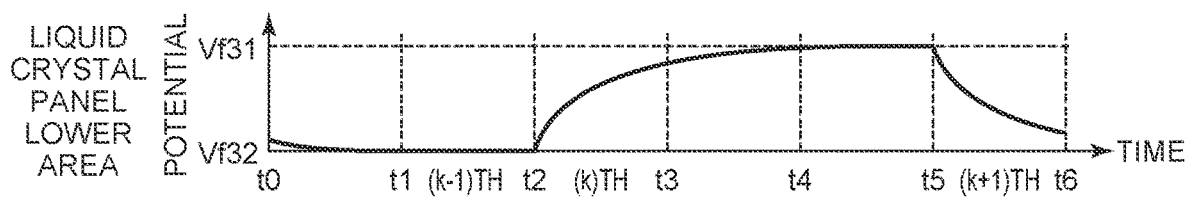
FIG. 9D is a timing chart schematically illustrating a temporal change of potential of a pixel belonging to a lower area of the liquid crystal panel according to the embodiment.

FIG. 9D is a timing chart schematic ally illustrating the temporal change of the potential of a pixel belonging to the lower area of the liquid crystal panel according to the embodiment.

Figure 9E:
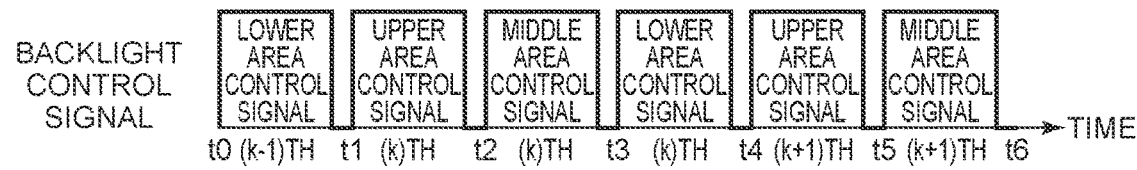
FIG. 9E is a timing chart schematically illustrating timing of a backlight driver receiving a control signal according to the embodiment.

FIG. 9E is a timing chart schematic ally illustrating the timing of the backlight driver receiving the control signal according to the embodiment.

Figure 9F:
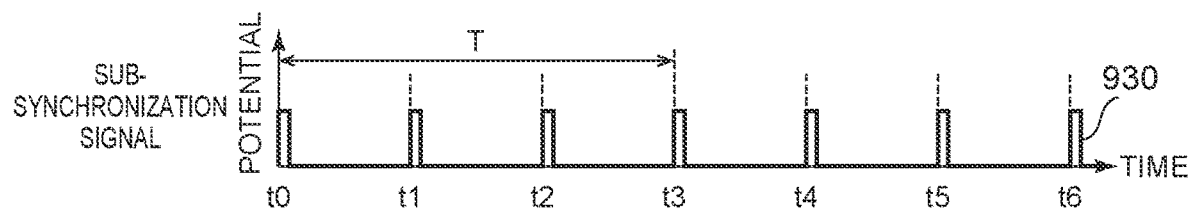
FIG. 9F is a timing chart schematically illustrating a temporal change of a sub-synchronization signal according to the embodiment.

FIG. 9F is a timing chart schematic ally illustrating the temporal change of a sub-synchronization signal according to the embodiment.

Figure 9G:
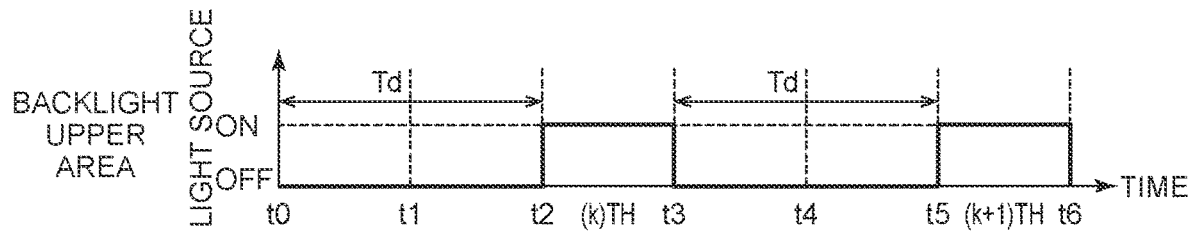
FIG. 9G is a timing chart schematically illustrating timing of controlling output of a light source belonging to the upper area of the backlight according to the embodiment.

FIG. 9G is a timing chart schematic ally illustrating the timing of controlling the output of a light source belonging to the upper area of the backlight according to the embodiment.

Figure 9H:
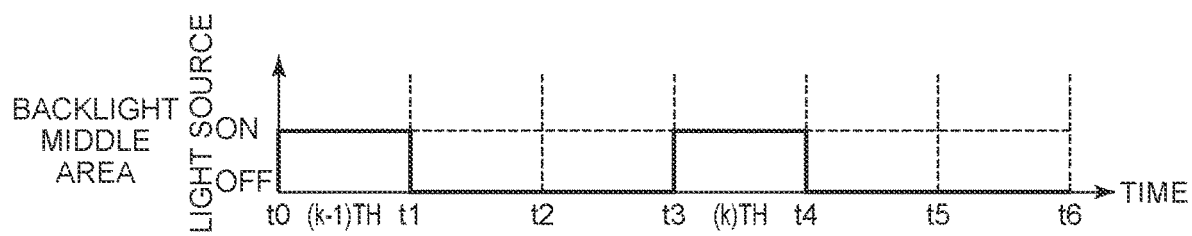
FIG. 9H is a timing chart schematically illustrating timing of controlling output of a light source belonging to the middle area of the backlight according to the embodiment.

FIG. 9H is a timing chart schematic ally illustrating the timing of controlling the output of a light source belonging to the middle area of the backlight according to the embodiment.

Figure 9I:
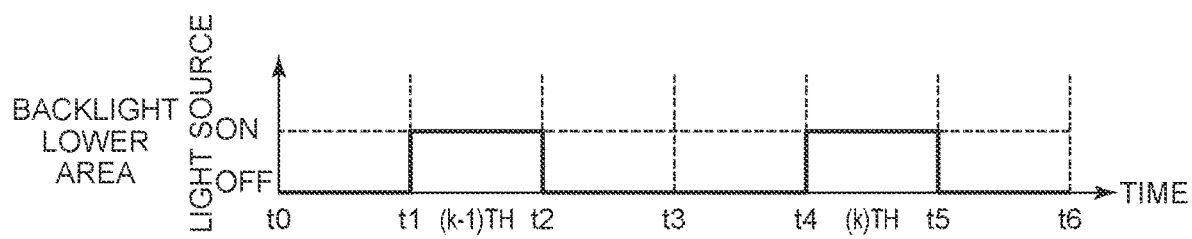
FIG. 9I is a timing chart schematically illustrating timing of controlling output of a light source belonging to the lower area of the backlight according to the embodiment.

FIG. 9I is a timing chart schematic ally illustrating the timing of controlling the output of a light source belonging to the lower area of the backlight according to the embodiment.

Timing Controller

The timing controller 140 is connected to an external device. Also, as shown in FIG. 5, the timing controller 140 is connected to the backlight driver 150 and the liquid crystal panel driver 160.

The timing controller 140 includes an input module 141, a luminance setting data generator 142, a gradation setting data generator 143, memory 144, a sub-synchronization signal generator 145, a control signal generator 146, and an output module 147.

The input module 141 includes, for example, an input interface connected to the external device. The input module 141 accepts inputs of a synchronization signal 920 and the multiple input images 910 from the external device.

As shown in FIG. 6A, each input image 910 includes multiple pixels 910p arranged in a matrix configuration. For easier understanding of the relationship between the elements of the image display device 100 hereinbelow, an XY orthogonal coordinate system is used to represent the arrangement directions of the elements in data such as the input image 910 in which elements such as the pixels 910p, etc., are arranged in a matrix configuration.

In an example described below, it is assumed that one pixel 910p of the input image 910 corresponds to one pixel 120p of the liquid crystal panel 120. In other words, the multiple pixels 910p are arranged in N2 rows and M2 columns. In the input image 910, four pixels 910p are included in an image area 910a corresponding to one light-emitting region 111s of the backlight 110. However, the correspondence between the pixels of the input image 910 and the pixels of the liquid crystal panel 120 may not be one-to-one. Also, the number of pixels 910p of the input image 910 corresponding to each light-emitting region 111s may be more or less than four.

The gradation is set for each pixel 910p. According to the embodiment, the input image 910 is a color image. For that reason, a blue gradation Gb, a green gradation Gg, and a red gradation Gr are set for each pixel 910p. For example, each of the gradations Gb, Gg, and Gr is a numeral that is not less than 0 and not more than 255 when represented using 8 bits.

The synchronization signal 920 is a signal that indicates the timing of switching the input image 910 displayed in the liquid crystal panel 120. As shown in FIG. 9A, the synchronization signal 920 is a pulse signal, e.g., a vertical synchronization signal.

As shown in FIG. 7, the luminance setting data generator 142 uses each input image 910 to generate luminance setting data D1 including setting values of the luminances of the light sources 116 of the backlight 110.

Specifically, the luminance setting data generator 142 extracts a maximum value Gmax(i, j) of the gradations of the multiple pixels 910p in the image area 910a of the input image 910 corresponding to the light-emitting region 111s positioned at the ith row and the jth column. Here, i is an integer that is not less than 1 and not more than N1, and j is an integer that is not less than 1 and not more than M1. The luminance setting data generator 142 converts the extracted maximum value Gmax(i, j) of the gradations into a luminance e1(i, j). The luminance setting data generator 142 uses the luminance e1(i, j) as the value of the element at the ith row and the jth column of the luminance setting data D1. The luminance setting data generator 142 performs this processing for all of the light-emitting regions 111s.

The luminance setting data D1 thus obtained is data of a matrix configuration that includes N1 rows and M1 columns. The value of the element of the luminance setting data D1 at the ith row and the jth column is the setting value of the luminance of the light-emitting region 111s positioned at the ith row and the jth column. However, the method for generating the luminance setting data is not limited to that described above.

As shown in FIG. 8, the gradation setting data generator 143 uses the luminance setting data D1, a luminance profile D3, and each input image 910 to generate gradation setting data D2 including setting values of the gradations of the pixels 120p of the liquid crystal panel 120. The luminance profile D3 is data that shows the luminance distribution at each position on the XY plane when the light source 116 of one light-emitting region 111s is lit. In FIG. 8, ON means that the light source 116 of the light-emitting region 111s is lit; and OFF means that the light source 116 of the light-emitting region 111s is unlit.

The gradation setting data generator 143 estimates a luminance value V(n, m) directly under the pixel 120p positioned at the nth row and the mth column of the liquid crystal panel 120 from the luminance setting data D1 and the luminance profile D3 by including both the luminance distribution in one light-emitting region 111s and the light leakage from the light-emitting regions 111s at the periphery. Here, n is an integer that is not less than 1 and not more than N2, and m is an integer that is not less than 1 and not more than M2.

The gradation setting data generator 143 substitutes the estimated luminance value V(n, m) and the blue gradation Gb of the pixel 910p corresponding to the pixel 120p of the input image 910 in a conversion formula Ef. The conversion formula Ef is, for example, a conversion formula that converts the luminance into the gradation based on gamma correction. An output value Efb of the conversion formula Ef obtained by substituting the blue gradation Gb in the conversion formula Ef is used by the gradation setting data generator 143 as the setting value of the blue gradation of the pixel 120p. Similar processing is performed also for the green gradation Gg; and an output value Efg of the conversion formula Ef obtained thereby is used as the setting value of the green gradation of the pixel 120p. The gradation setting data generator 143 performs similar processing also for the red gradation Gr; and an output value Efr of the conversion formula Ef obtained thereby is used as the setting value of the red gradation of the pixel 120p. The gradation setting data generator 143 uses the output values Efb, Efg, and Efr of the conversion formula Ef as the value of an element e2(n, m) at the nth row and the mth column of the gradation setting data D2. The gradation setting data generator 143 performs this processing for all of the pixels 120p of the liquid crystal panel 120.

The gradation setting data D2 thus obtained is data of a matrix configuration of N2 rows and M2 columns. The three values Efb, Efg, and Efr of the element e2(n, m) at the nth row and the mth column of the gradation setting data D2 correspond respectively to the setting value of the blue gradation, the setting value of the green gradation, and the setting value of the red gradation of the pixel 120p positioned at the nth row and the mth column of the liquid crystal panel 120. However, the method for generating the gradation setting data is not limited to that described above.

The luminance setting data generator 142 and the gradation setting data generator 143 include, for example, a processor such as a CPU (Central Processing Unit), etc.

The memory 144 stores various data and various programs necessary for controlling the backlight 110 and the liquid crystal panel 120 such as the input image 910, the luminance setting data D1, the gradation setting data D2, the luminance profile D3, etc. The memory 144 includes, for example, ROM (Read-Only Memory) and RAM (Random-Access Memory).

The sub-synchronization signal generator 145 uses the synchronization signal 920 to generate a sub-synchronization signal 930. Although details are described below, the sub-synchronization signal 930 is a signal that indicates the timing of switching areas 110z of the backlight 110 of which outputs are controlled by the backlight driver 150. As shown in FIG. 9F, the sub-synchronization signal 930 is, for example, a pulse signal. The sub-synchronization signal 930 is synchronous with the synchronization signal 920; and multiple pulses of the sub-synchronization signal 930 are included in one period T of the synchronization signal 920. According to the embodiment, an example is shown in which three pulses of the sub-synchronization signal 930 are included in one period T. The sub-synchronization signal generator 145 includes, for example, a generation circuit of a pulse signal.

The control signal generator 146 generates a control signal D1a of the backlight 110 based on the luminance setting data D1. The control signal D1a is, for example, a PWM (Pulse Width Modulation) signal. The control signal generator 146 includes, for example, a PWM signal generation circuit.

The output module 147 includes an output interface connected to the backlight 110, an output interface connected to the liquid crystal panel 120, etc. As shown in FIG. 5, the output module 147 outputs the sub-synchronization signal 930 and the control signal D1a of the backlight 110 to the backlight driver 150. Also, the output module 147 outputs the gradation setting data D2 to the liquid crystal panel driver 160 as a control signal D2a of the liquid crystal panel 120. The output module 147 also outputs the synchronization signal 920 to the liquid crystal panel driver 160. When it is necessary to convert the gradation setting data into a control signal of the liquid crystal panel 110, the control signal generator 146 may convert the gradation setting data D1 into a control signal of the liquid crystal panel 110; and the output module 147 may output the control signal to the liquid crystal panel 110.

Backlight Driver

The backlight driver 150 includes a data storage 151, a driver 152, an area switcher 153, and a timing adjuster 154. The data storage 151 stores the control signal D1a of the backlight 110. The data storage 151 includes, for example, a latch circuit that can store the control signal D1a of the backlight 110.

When the backlight driver 150 controls the outputs of the light sources 116 of the light-emitting regions 111s, the backlight 110 can be divided into the multiple areas 110z arranged in the −Y direction as shown in FIG. 6B. At least one row of the light-emitting regions 111s is included in each area 110z. FIG. 6B shows an example in which the backlight 110 is divided into three areas 110z; and three rows of the light-emitting regions 111s are included in each area 110z. Hereinbelow, the area 110z among the three areas 110z that is positioned furthest toward the +Y side also is called an "upper area 110z1"; the area 110z positioned at the −Y side of the upper area 110z1 also is called a "middle area 110z2"; and the area 110z positioned at the −Y side of the middle area 110z2 also is called a "lower area 110z3". However, the number of areas of the backlight and the number of light-emitting regions included in each area are not limited to such numbers. For example, the number of areas of the backlight may be four or more.

The driver 152 can simultaneously drive the light sources 116 in one area 110z. The driver 152 includes, for example, a drive circuit of the multiple light sources 116.

The area switcher 153 switches the area 110z that is driven by the driver 152 sequentially in the −Y direction at the timing of the rise of the sub-synchronization signal 930. For example, the area switcher 153 is connected between the driver 152 and the backlight 110 and includes a switch element that can switch the area 110z driven by the driver 152. Hereinbelow, a series of processing of switching the outputs of the light sources 116 of the light-emitting regions 111s of the backlight 110 sequentially in the −Y direction for each of the areas 110z is called "the processing of switching the outputs of the light sources 116 of the light-emitting regions 111s".

The timing adjuster 154 adjusts the timing of transmitting the control signal D1a from the data storage 151 to the driver 152. The timing adjuster 154 includes, for example, a shift register circuit connected between the data storage 151 and the driver 152. The functions of the timing adjuster 154 are described below.

Liquid Crystal Panel Driver

The liquid crystal panel driver 160 includes a drive circuit of the liquid crystal panel 120, etc.

When the liquid crystal panel driver 160 controls the gradations of the pixels 120p of the liquid crystal panel 120, the liquid crystal panel 120 can be divided into multiple areas 120z arranged in the −Y direction as shown in FIG. 6C. Each area 120z includes one row of the pixels 120p. Hereinbelow, the portion of the liquid crystal panel 120 positioned directly above the upper area 110z1 of the backlight 110 is called an "upper portion 121". The portion of the liquid crystal panel 120 positioned directly above the middle area 110z2 of the backlight 110 is called a "middle portion 122". The portion of the liquid crystal panel 120 positioned directly above the lower area 110z3 of the backlight 110 is called a "lower portion 123".

The area 120z among the multiple areas 120z included in the upper portion 121 positioned furthest toward the +Y side also is called an "upper area 120z1". The area 120z among the multiple areas 120z included in the middle portion 122 positioned furthest toward the +Y side also is called a "middle area 120z2". The area 120z among the multiple areas 120z included in the lower portion 123 positioned furthest toward the +Y side also is called a "lower area 120z3".

For example, the liquid crystal panel driver 160 starts processing of switching the voltages applied to the pixels 120p according to one input image 910 at the timing of the rise of the synchronization signal 920. At this time, the liquid crystal panel driver 160 simultaneously drives the pixels 120p of one area 120z. Then, the liquid crystal panel driver 160 switches the area 120z that is driven sequentially in the −Y direction. Accordingly, "the processing of switching the voltages applied to the pixels 120p of the liquid crystal panel 120" means the series of processing of switching the voltages applied to the pixels 120p of the liquid crystal panel 120 sequentially in the −Y direction for each of the areas 120z.

The timing adjuster 154 of the backlight driver 150 adjusts the timing of transmitting the kth-frame input image 910 from the data storage 151 to the driver 152 to start the processing of switching the outputs of the light sources 116 of the light-emitting regions 111s after a delay interval Td from the start of the processing of switching the voltages applied to the pixels 120p of the liquid crystal panel 120 according to the kth-frame input image 910. Here, k is any integer that is not less than 1.

Specifically, for example, when k=1, the timing adjuster 154 does not transmit the control signal D1a to the driver 152 when the delay interval Td has not elapsed from the start of the processing of switching the voltages applied to the pixels 120p of the liquid crystal panel 120 according to a first input image 910. In such a case, for example, the driver 152 does not drive any of the areas 110z of the backlight 110. When the delay interval Td has elapsed from the start of the processing of switching the voltages applied to the pixels 120p of the liquid crystal panel 120 according to the first input image 910, the timing adjuster 154 transmits the control signal D1a corresponding to the first input image 910 to the driver 152. Accordingly, in such a case, the outputs of the light sources 116 of the light-emitting regions 111s switch to the outputs corresponding to the control signal D1a corresponding to the first input image 910.

In the case where k≥2, the timing adjuster 154 transmits the control signal D1a corresponding to the (k−1)th-frame input image 910 to the driver 152 when the delay interval Td has not elapsed from the start of the processing of switching the voltages applied to the pixels 120p of the liquid crystal panel 120 according to the kth-frame input image 910. In such a case, the outputs of the light sources 116 of the light-emitting regions 111s become the outputs corresponding to the control signal D1a corresponding to the (k−1)th-frame input image 910. When k is any integer that is not less than 2, the timing adjuster 154 transmits the control signal D1a corresponding to the kth-frame input image 910 to the driver 152 when the delay interval Td has elapsed from the start of the processing of switching the voltages applied to the pixels 120p of the liquid crystal panel 120 according to the kth-frame input image 910. Accordingly, in such a case, the outputs of the light sources 116 of the light-emitting regions 111s are switched to the outputs corresponding to the control signal D1a corresponding to the kth-frame input image 910.

An image display method that uses the image display device 100 according to the embodiment will now be described.

First, the timing controller 140 generates the luminance setting data D1 for the kth-frame input image 910. Then, the timing controller 140 converts the luminance setting data D1 into the control signal D1a of the backlight 110. Then, the timing controller 140 outputs the control signal D1a and the sub-synchronization signal 930 to the backlight driver 150.

The timing controller 140 generates the gradation setting data D2 for the kth-frame input image 910. Then, the timing controller 140 uses the gradation setting data D2 as the control signal D2a and outputs the control signal D2a and the synchronization signal 920 to the liquid crystal panel driver 160.

Then, the liquid crystal panel driver 160 switches the voltages applied to the pixels 120p of the liquid crystal panel 120 based on the control signal D2a corresponding to the kth-frame input image 910; and the backlight driver 150 switches the outputs of the light sources 116 of the light-emitting regions 111s of the backlight 110 based on the control signal D1a corresponding to the kth-frame input image 910. This process will now be elaborated.

A case where k 2 will now be described. The control signal D2a that corresponds to the kth-frame input image 910 is simply called the "kth-frame control signal D2a". Similarly, the control signal D1a that corresponds to the kth-frame input image 910 is simply called the "kth-frame control signal D1a". Hereinbelow, the time of the initial rise of the synchronization signal 920 in FIG. 9A is referred to as "t0". The interval of one period T of the synchronization signal 920 divided by the total number of the areas 110z of the backlight 110, i.e., 3, is called a "unit interval Δt". Also, the times as the unit interval Δt elapses from the time t0 are referred to as "time t1", "time t2", "time t3", "time t4", "time t5", and "time t6" in this order.

First, when the rise of the synchronization signal 920 is detected at the time t0, the liquid crystal panel driver 160 starts the processing of switching the voltages applied to the pixels 120p according to the kth-frame control signal D2a. In this processing, the liquid crystal panel driver 160 switches the voltages applied to the pixels 120p from the values corresponding to the (k−1)th-frame control signal D2a to the values corresponding to the kth-frame control signal D2a sequentially in the −Y direction for each of the areas 120z.

Accordingly, first, as shown in FIG. 9B, the potentials of the pixels 120p belonging to the upper area 120z1 of the liquid crystal panel 120 start to switch to the values corresponding to the kth-frame control signal D2a at substantially the time t0. However, it takes time for the potentials of the pixels 120p to reach a target potential Vf11 corresponding to the kth-frame control signal D2a.

As shown in FIG. 9E, the data storage 151 of the backlight driver 150 starts to receive the (k−1)th-frame control signal D1a of the lower area 110z3 from the timing controller 140 at the time t0.

As shown in FIG. 9F, the sub-synchronization signal 930 also rises at the time t0.

An example will now be described in which the light sources 116 are lit when the backlight driver 150 controls the outputs of the light sources 116 in the areas 110z. However, the light sources 116 may be unlit when the backlight driver 150 controls the outputs of the light sources 116 according to the control signal D1a.

At the timing of the time t0, the backlight driver 150 controls the outputs of the light sources 116 of the middle area 110z2 according to the (k−1)th-frame control signal D1a that is received beforehand; and the light sources 116 of the upper area 110z1 and the lower area 110z3 are not driven. Therefore, the outputs of the light sources 116 of the middle area 110z2 become the outputs corresponding to the (k−1)th-frame control signal D1a.

At this time, as shown in FIG. 9C, the potentials of the pixels 120p belonging to the middle area 120z2 of the liquid crystal panel 120 substantially reach the values corresponding to the (k−1)th-frame control signal D2a. Therefore, the image to be displayed in the middle area 120z2 of the liquid crystal panel 120 and the outputs of the light sources 116 in the middle area 110z2 of the backlight 110 positioned directly under the middle area 120z2 can be matched.

Then, as shown in FIG. 9C, the potentials of the pixels 120p belonging to the middle area 120z2 of the liquid crystal panel 120 start to switch to the values corresponding to the kth-frame control signal D2a at substantially the time t1. However, it takes time for the potentials of the pixels 120p to reach a target potential Vf21 corresponding to the kth-frame control signal D2a.

As shown in FIG. 9E, the data storage 151 of the backlight driver 150 starts to receive the kth-frame control signal D1a of the upper area 110z1 at the time t1.

As shown in FIG. 9F, the sub-synchronization signal 930 rises at the time t1.

When the rise of the sub-synchronization signal 930 is detected, the backlight driver 150 controls the outputs of the light sources 116 of the lower area 110z3 according to the (k−1)th-frame control signal D1a of the lower area 110z3 received at the time t0 as shown in FIGS. 9G to 9I; and the light sources 116 of the upper area 110z1 and the middle area 110z2 are not driven. Therefore, the outputs of the light sources 116 of the lower area 110z3 become the outputs corresponding to the (k−1)th-frame control signal D1a.

At this time, as shown in FIG. 9D, the potentials of the pixels 120p belonging to the lower area 120z3 of the liquid crystal panel 120 substantially reach the values corresponding to the (k−1)th-frame control signal D2a. Therefore, the image to be displayed in the lower area 120z3 of the liquid crystal panel 120 and the outputs of the light sources 116 in the lower area 110z3 of the backlight 110 positioned directly under the lower area 120z3 can be matched.

Then, as shown in FIG. 9D, the potentials of the pixels 120p belonging to the lower area 120z3 of the liquid crystal panel 120 start to switch to the values corresponding to the kth-frame control signal D2a at substantially the time t2. However, it takes time for the potentials of the pixels 120p to reach a target potential Vf31 corresponding to the kth-frame control signal D2a.

As shown in FIG. 9E, the data storage 151 of the backlight driver 150 starts to receive the kth-frame control signal D1a of the middle area 110z2 at the time t2.

As shown in FIG. 9F, the sub-synchronization signal 930 rises at the time t2.

When the rise of the sub-synchronization signal 930 is detected, the backlight driver 150 controls the outputs of the light sources 116 of the upper area 110z1 according to the kth-frame control signal D1a of the upper area 110z1 received at the time t1 as shown in FIGS. 9G to 9I; and the light sources 116 of the middle area 110z2 and the lower area 110z3 are not driven. Therefore, the outputs of the light sources 116 of the upper area 110z1 become the outputs corresponding to the kth-frame control signal D1a. Thus, the processing of switching the outputs of the light-emitting regions 111s of the backlight 110 according to the kth-frame input image 910 starts after the delay interval Td that is two lengths of the unit interval Δt has elapsed from the time t0 at which the processing of switching the voltages applied to the pixels 120p of the liquid crystal panel 120 according to the kth-frame input image 910 started.

At this time, as shown in FIG. 9B, the potentials of the pixels 120p belonging to the upper area 120z1 of the liquid crystal panel 120 substantially reach the values corresponding to the kth-frame control signal D2a. Therefore, the image to be displayed in the upper area 120z1 of the liquid crystal panel 120 and the outputs of the light sources 116 in the upper area 110z1 of the backlight 110 positioned directly under the upper area 120z1 can be matched.

Then, as shown in FIG. 9A, the synchronization signal 920 again rises at the time t3.

When the rise of the synchronization signal 920 is detected, the liquid crystal panel driver 160 starts the processing of switching the voltages applied to the pixels 120p according to the (k+1)th control signal D2a. Therefore, as shown in FIG. 9B, the potentials of the pixels 120p belonging to the upper area 120z1 of the liquid crystal panel 120 start to switch to the values corresponding to the (k+1)th control signal D2a at substantially the time t3. However, it takes time for the potentials of the pixels 120p to reach a target potential Vf12 corresponding to the (k+1)th control signal D2a.

As shown in FIG. 9E, the data storage 151 of the backlight driver 150 starts to receive the kth-frame control signal D1a of the lower area 110z3 at the time t3.

As shown in FIG. 9F, the sub-synchronization signal 930 rises at the time t3.

When the rise of the sub-synchronization signal 930 is detected, the backlight driver 150 controls the outputs of the light sources 116 of the middle area 110z2 according to the kth-frame control signal D1a of the middle area 110z2 received at the time t2 as shown in FIGS. 9G to 9I; and the light sources 116 of the upper area 110z1 and the lower area 110z3 are not driven. Therefore, the outputs of the light sources 116 of the middle area 110z2 become the outputs corresponding to the kth-frame control signal D1a.

At this time, as shown in FIG. 9C, the potentials of the pixels 120p belonging to the middle area 120z2 of the liquid crystal panel 120 substantially reach the values corresponding to the kth-frame control signal D2a. Therefore, the image to be displayed in the middle area 120z2 of the liquid crystal panel 120 and the outputs of the light sources 116 in the middle area 110z2 of the backlight 110 positioned directly under the middle area 120z2 can be matched.

Then, as shown in FIG. 9C, the potentials of the pixels 120p belonging to the middle area 120z2 of the liquid crystal panel 120 start to switch to the values corresponding to the (k+1)th control signal D2a at substantially the time t4. However, it takes time for the potentials of the pixels 120p to reach a target potential Vf22 corresponding to the (k+1)th control signal D2a.

As shown in FIG. 9E, the data storage 151 of the backlight driver 150 starts to receive the (k+1)th control signal D1a of the upper area 110z1 at the time t4.

As shown in FIG. 9F, the sub-synchronization signal 930 rises at the time t4.

When the rise of the sub-synchronization signal 930 is detected, the backlight driver 150 controls the outputs of the light sources 116 of the lower area 110z3 according to the kth-frame control signal D1a of the lower area 110z3 received at the time t3 as shown in FIGS. 9G to 9I; the light sources 116 of the upper area 110z1 and the middle area 110z2 are not driven. Therefore, the outputs of the light sources 116 of the lower area 110z3 become the outputs corresponding to the kth-frame control signal D1a.

At this time, as shown in FIG. 9D, the potentials of the pixels 120p belonging to the lower area 120z3 of the liquid crystal panel 120 substantially reach the values corresponding to the kth-frame control signal D2a. Therefore, the image to be displayed in the lower area 120z3 of the liquid crystal panel 120 and the outputs of the light sources 116 in the lower area 110z3 of the backlight 110 positioned directly under the lower area 120z3 can be matched.

As shown in FIG. 9D, the potentials of the pixels 120p belonging to the lower area 120z3 of the liquid crystal panel 120 start to switch to the values corresponding to the (k+1)th control signal D2a at substantially the time t5. However, it takes time for the potentials of the pixels 120p to reach a target potential Vf32 corresponding to the (k+1)th control signal D2a.

As shown in FIG. 9E, the data storage 151 of the backlight driver 150 starts to receive the (k+1)th control signal D1a of the middle area 110z2 at the time t5.

As shown in FIG. 9F, the sub-synchronization signal 930 rises at the time t5.

When the rise of the sub-synchronization signal 930 is detected, the backlight driver 150 controls the outputs of the light sources 116 of the upper area 110z1 according to the (k+1)th control signal D1a of the upper area 110z1 received at the time t4 as shown in FIGS. 9G to 9I; and the light sources 116 of the middle area 110z2 and the lower area 110z3 are not driven. Therefore, the outputs of the light sources 116 of the upper area 110z1 become the outputs corresponding to the (k+1)th control signal D1a.

At this time, as shown in FIG. 9B, the potentials of the pixels 120p belonging to the upper area 120z1 of the liquid crystal panel 120 substantially reach the values corresponding to the (k+1)th control signal D2a. Therefore, the image to be displayed in the upper area 120z1 of the liquid crystal panel 120 and the outputs of the light sources 116 in the upper area 110z1 of the backlight 110 positioned directly under the upper area 120z1 can be matched.

Processing similar to the processing from the time t0 to the time t5 is repeatedly performed at and after the time t6.

As described above, when the rise of the synchronization signal 920 is detected, the liquid crystal panel driver 160 starts the processing of switching the voltages applied to the pixels 120p according to the kth-frame control signal D2a in the −Y direction for each of the areas 120z. Then, the liquid crystal panel driver 160 switches the voltages applied to all of the pixels 120p of the liquid crystal panel 120 in the interval until the synchronization signal 920 again rises. However, it takes time for the potentials of the pixels 120p to reach the values corresponding to the kth-frame control signal D2a.

To address this issue, after the delay interval Td has elapsed from the rise of the synchronization signal 920, the backlight driver 150 starts the processing of switching the outputs of the light sources 116 of the light-emitting regions 111s in the −Y direction for each of the areas 110z according to the kth-frame control signal D1a. As a result, the image to be displayed in the areas 120z of the liquid crystal panel 120 and the outputs of the light sources 116 in the areas 110z of the backlight 110 positioned directly under the areas 120z can be matched.

The delay interval Td is less than the period T of the synchronization signal 920. For example, the delay interval Td is represented by the following Formula (1).

$$Td = \Delta t \times N \quad \text{(Formula 1)}$$

Td: Delay interval
Δt: Unit interval (=synchronization signal period T/total number of backlight areas)
N: Integer not less than 1

Thus, the control of the image display device 100 is easier because the synchronization signal 920 and the sub-synchronization signal 930 can be synchronized by setting the delay interval Td to be an integer multiple of the unit interval Δt, i.e., the period T of the synchronization signal 920 divided by the total number of the areas 110z of the backlight 110. Although an example is described in the embodiment in which N is 2, N is adjustable as appropriate based on the length of the unit interval Δt and/or the time necessary for the potentials of the pixels 120p of the liquid crystal panel 120 to reach the potentials corresponding to the control signal. Accordingly, N may be 1. Also, the delay interval Td may not be an integer multiple of the unit interval Δt.

The image display method is not limited to the image display method described above. For example, the backlight driver 150 may start to receive the kth-frame control signal D1a of the upper area 110z1 at the time t0.

Effects of the embodiment will now be described.

The image display method according to the embodiment includes a process of switching the voltages applied to the pixels 120p and the outputs of the light sources 116 of the light-emitting regions 111s according to the input image 910 input to the controller 130. In the switching process, the voltages applied to the pixels 120p are switched sequentially in the −Y direction for each of the areas 120z; and the outputs of the light sources 116 of the light-emitting regions 111s are switched sequentially in the −Y direction for each of the areas 110z. Then, the processing of switching the outputs of the light sources 116 of the light-emitting regions 111s is started after the delay interval Td has elapsed from the start of the processing of switching the voltages applied to the pixels 120p. As a result, the image to be displayed in each portion of the liquid crystal panel 120 and the luminance directly under each portion are easily matched. The quality of the image displayed in the image display device 100 can be improved thereby.

Also, in the switching process, the processing of switching the voltages applied to the pixels 120p is started according to the rise of the synchronization signal 920 having a pulse form. Then, the processing of switching the outputs of the light sources 116 of the light-emitting regions 111s is started after the delay interval Td has elapsed from the rise of the synchronization signal 920. The delay interval Td is not less than the unit interval Δt, i.e., the period T of the synchronization signal 920 divided by the total number of the areas 110z. Therefore, the timing of starting the processing of switching the outputs of the light sources 116 of the light-emitting regions 111s can be adjusted so that the image to be displayed in each area 120z of the liquid crystal panel 120 and the outputs of the light sources 116 in the area 110z of the backlight 110 positioned directly under each area 120z are matched until the interval of one period T of the synchronization signal 920 has elapsed.

The delay interval Td is less than one period T of the synchronization signal 920. Therefore, the mismatch between the image to be displayed in each portion of the liquid crystal panel 120 and the luminance directly under each portion can be suppressed.

A modification of the planar light source will now be described.

Figure 10A:
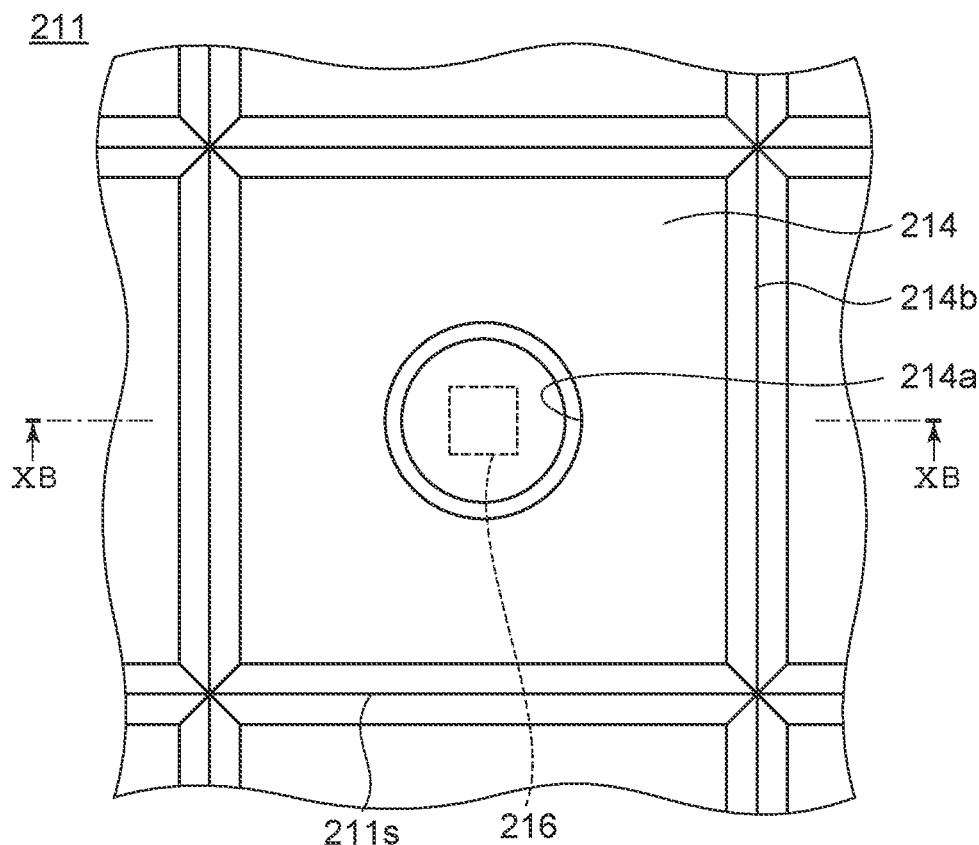
FIG. 10A illustrates a top view of a modification of the planar light source.

FIG. 10A illustrates a top view of the modification of the planar light source.

Figure 10B:
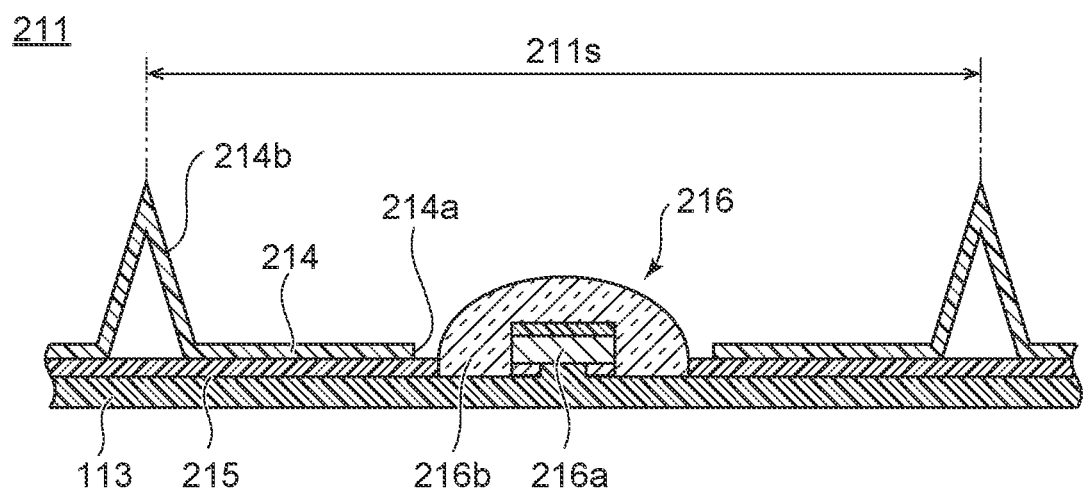
FIG. 10B illustrates a cross-sectional view of the planar light source along line XB-XB in FIG. 10A.

FIG. 10B illustrates a cross-sectional view of the planar light source along line XB-XB inf FIG. 10A.

As a general rule in the following description, only the differences with the embodiment described above are described. Other than the aspects described below, the modification is similar to the embodiment described above.

A planar light source 211 of the modification includes the substrate 113, a bonding member 215, a light-reflective sheet 214, and multiple light sources 216.

The light-reflective sheet 214 is adhered to the substrate 113 with the bonding member 215. Multiple through-holes 214a are provided in the light-reflective sheet 214. The multiple through-holes 214a are arranged in a matrix configuration in the X-direction and the Y-direction. The light source 216 is located in each through-hole 214a.

The light-reflective sheet 214 includes a bent portion 214b that surrounds the through-holes 214a, i.e., the light sources 216. The bent portion 214b is made by bending the light-reflective sheet 214 so that the light-reflective sheet 214 protrudes upward. One region of the planar light source 211 surrounded with the upper end of the bent portion 214b corresponds to one light-emitting region 211s.

A resin sheet (e.g., a resin foam sheet) that includes many bubbles, a resin sheet that includes a light-diffusing material, etc., can be used as the light-reflective sheet 214. For example, a thermoplastic resin such as an acrylic resin, a polycarbonate resin, a cyclic polyolefin resin, a polyethylene terephthalate resin, a polyester resin, or the like, a thermosetting resin such as an epoxy resin or a silicone resin, etc., are examples of the resin included in the light-reflective sheet 214. Titanium oxide, silica, alumina, zinc oxide, glass, etc., are examples of the light-diffusing material included in the light-reflective sheet 214.

Each light source 216 includes a light-emitting element 216a and a wavelength conversion member 216b. The light-emitting element 216a is electrically connected to the substrate 113. The wavelength conversion member 216b covers the side surface and the upper surface of the light-emitting element 216a.

As described above, the structure of the planar light source is not limited to the structure of the embodiment as long as the light-emitting regions are arranged in a matrix configuration.

For example, the present disclosure can be utilized in a display of a device such as a television, a personal computer, a game machine, etc.

What is claimed is:

1. An image display method using an image display device including:
   a backlight having a plurality of light-emitting regions arranged in a matrix configuration in a first direction and a second direction, the light-emitting regions being divided into a plurality of first areas in the first direction; and
   a liquid crystal panel on the backlight, the liquid crystal panel having a plurality of pixels arranged in a matrix configuration in the first and second directions, the pixels being divided into a plurality of second areas in the first direction, the method comprising:
   performing a first operation to cause light to be emitted from the light-emitting regions at respective intensity in accordance with frame image data, sequentially with respect to each of the first areas; and
   performing a second operation to apply voltages to the pixels at respective levels in accordance with the frame image data, sequentially with respect to each of the second areas,
   wherein a timing at which the first operation with respect to each of the first areas is started is delayed from a timing at which the second operation with respect to a corresponding one of the second areas is started by a predetermined interval,
   wherein the second operation with respect to an earliest one of the second areas is started in synchronization with a rising edge of a synchronization signal, and
   wherein a timing at which the second operation with respect to a last one of the second areas is started is same as a timing at which the first operation with respect to an earliest one of the first areas is started.

2. The image display method according to claim 1, further comprising:
   generating, based on the synchronization signal, a subdivided synchronization signal having a period less than a period of the synchronization signal,
   wherein the first operation with respect to an earliest one of the first areas is started in synchronization with a rising edge of the subdivided synchronization signal.

3. The image display method according to claim 2, wherein
   the first operation with respect to the earliest one of the first areas is terminated in synchronization with a next rising edge of the subdivided synchronization signal, which is immediately subsequent to the rising edge of the subdivided synchronization signal.

4. The image display method according to claim 1, wherein the predetermined interval is equal to or greater than an amount that is equal to a period of the synchronization signal divided by the number of the first areas.

5. The image display method according to claim 4, wherein the predetermined interval is less than the period of the synchronization signal.

6. The image display method according to claim 1, wherein a timing at which the first operation with respect to a next one of the first areas, which is immediately subsequent to the earliest one of the first areas, is started is delayed from a timing at which the first operation with respect to the earliest one of the first areas is started by an amount that is equal to a period of the synchronization signal divided by the number of the first areas.

7. The image display method according to claim 1, wherein the number of first areas is equal to the number of second areas.

8. The image display method according to claim 1, wherein the first direction is a vertical direction of display, and the second direction is a horizontal direction of display.

9. An image display device comprising:
   a backlight including a plurality of light-emitting regions arranged in a matrix configuration in a first direction and a second direction, the light-emitting regions being divided into a plurality of first areas in the first direction;
   a liquid crystal panel on the backlight, the liquid crystal panel including a plurality of pixels arranged in a matrix configuration in the first and second directions, the pixels being divided into a plurality of second areas in the first direction; and
   a controller configured to perform:
     a first operation to cause light to be emitted from the light-emitting regions at respective intensity in accordance with frame image data, sequentially with respect to each of the first areas, and
     a second operation to apply voltages to the pixels at respective levels in accordance with the frame image data, sequentially with respect to each of the second areas,
   wherein a timing at which the controller starts the first operation with respect to each of the first areas is delayed from a timing at which the controller starts the second operation with respect to a corresponding one of the second areas by a predetermined interval,
   wherein the controller is configured to start the second operation with respect to an earliest one of the second areas in synchronization with a rising edge of a synchronization signal, and
   wherein a timing at which the controller starts the second operation with respect to a last one of the second areas is same as a timing at which the controller starts the first operation with respect to an earliest one of the first areas.

10. The image display device according to claim 9, wherein the controller is configured to generate, based on the synchronization signal, a subdivided synchronization signal having a period less than a period of the synchronization signal, and start the first operation with respect to an earliest one of the first areas in synchronization with a rising edge of the subdivided synchronization signal.

11. The image display device according to claim 10, wherein the controller terminates the first operation with respect to the earliest one of the first areas in synchronization with a next rising edge of the subdivided synchronization signal, which is immediately subsequent to the rising edge of the subdivided synchronization signal.

12. The image display device according to claim 9, wherein the predetermined interval is equal to or greater than an amount that is equal to a period of the synchronization signal divided by the number of the first areas.

13. The image display device according to claim 12, wherein the predetermined interval is less than the period of the synchronization signal.

14. The image display device according to claim 9, wherein a timing at which the controller starts the first operation with respect to a next one of the first areas, which is immediately subsequent to the earliest one of the first areas, is delayed from a timing at which the controller starts the first operation with respect to the earliest one of the first areas by an amount that is equal to a period of the synchronization signal divided by the number of the first areas.

15. The image display device according to claim 9, wherein the number of first areas is equal to the number of second areas.

16. The image display device according to claim 9, wherein the first direction is a vertical direction of display, and the second direction is a horizontal direction of display.

\* \* \* \* \*